United States Patent
Fay

(10) Patent No.: US 10,814,776 B2
(45) Date of Patent: Oct. 27, 2020

(54) LIGHT EMITTING DIODE LIGHTING SYSTEM

(71) Applicant: LUX Lighting Systems LLC, Ft. Wright, KY (US)

(72) Inventor: Jonathan Eric Fay, Keizer, OR (US)

(73) Assignee: LUX Lighting Systems LLC, Ft. Wright, KY (US)

( * ) Notice: Subject to any disclaimer, the term of this patent is extended or adjusted under 35 U.S.C. 154(b) by 0 days.

(21) Appl. No.: 15/362,898

(22) Filed: Nov. 29, 2016

(65) Prior Publication Data

US 2017/0072836 A1 Mar. 16, 2017

Related U.S. Application Data

(63) Continuation of application No. 13/426,772, filed on Mar. 22, 2012, now Pat. No. 9,539,932.

(51) Int. Cl.
*B60Q 1/00* (2006.01)
*H05B 45/00* (2020.01)
(Continued)

(52) U.S. Cl.
CPC ......... *B60Q 1/0088* (2013.01); *B60Q 1/2696* (2013.01); *B60Q 1/30* (2013.01);
(Continued)

(58) Field of Classification Search
CPC .... H05B 37/02; H05B 33/08; H05B 33/0806; H05B 33/0815; H05B 33/089;
(Continued)

(56) References Cited

U.S. PATENT DOCUMENTS 5,559,681 A * 9/1996 Duarte .................. F21V 21/08
362/231
5,661,374 A  8/1997 Cassidy et al.
(Continued)

FOREIGN PATENT DOCUMENTS

EP  2080947 A1  7/2009

OTHER PUBLICATIONS www.ledworldlighting.com/ledstripRGB.html (and similar pages on this website), LED World Lighting, LED RGB Strip Light--Color Changing Light--dated retrieved Dec. 19, 2011.
(Continued)

*Primary Examiner* — Thai Pham
(74) *Attorney, Agent, or Firm* — BakerHostetler

(57) ABSTRACT

Methods, systems, devices and/or apparatus related to lighting systems, and, specifically, to LED lighting systems for vehicles. One example provides a lighting system that includes a power control component, a wire harness, and a light emitting diode component. The power control component may be in electrical communication with a power supply. The power control component may receive an input voltage from the power supply, adjust the input voltage to generate an output voltage, and output the output voltage. The wire harness may be in electrical communication with the power control component. The light emitting diode light component may be in electrical communication with the wire harness, and may include a plurality of light emitting diodes electrically coupled in a parallel configuration via a plurality of wires, each of the plurality of wires being substantially shaped as a wave.

23 Claims, 33 Drawing Sheets

(51) Int. Cl.

| | |
|---|---|
| *B60Q 1/26* | (2006.01) |
| *F21S 43/14* | (2018.01) |
| *F21S 45/10* | (2018.01) |
| *H05B 45/10* | (2020.01) |
| *H05B 45/37* | (2020.01) |
| *H05B 45/50* | (2020.01) |
| *F21S 41/153* | (2018.01) |
| *B60Q 1/30* | (2006.01) |
| *B60Q 1/34* | (2006.01) |
| *F21Y 115/10* | (2016.01) |

(52) U.S. Cl.
CPC .............. *B60Q 1/34* (2013.01); *F21S 41/153* (2018.01); *F21S 43/14* (2018.01); *F21S 45/10* (2018.01); *H05B 45/00* (2020.01); *H05B 45/10* (2020.01); *H05B 45/37* (2020.01); *H05B 45/50* (2020.01); *F21Y 2115/10* (2016.08)

(58) Field of Classification Search
CPC .... H05B 33/0845; H05B 45/00; H05B 45/37; H05B 45/50; B60Q 1/02; B60Q 1/0088; B60Q 1/2696; B60Q 1/00; F21S 45/00; F21S 45/10; F21S 45/50; F21S 43/14; F21Y 2115/00
USPC ..... 315/77, 185 R, 192, 291, 294, 297, 307; 362/249.22, 249.03, 249.04, 249.11
See application file for complete search history.

(56) References Cited

U.S. PATENT DOCUMENTS

| | | | |
|---|---|---|---|
| 6,158,882 A | 12/2000 | Bischoff, Jr. | |
| 6,371,637 B1 * | 4/2002 | Atchinson | F21V 19/005 |
| | | | 362/249.04 |
| 6,619,831 B2 | 9/2003 | Kanesaka | |
| 6,840,655 B2 | 1/2005 | Shen | |
| 6,866,398 B2 | 3/2005 | Lin | |
| 7,033,036 B2 | 4/2006 | Pederson | |
| 7,034,230 B2 | 4/2006 | Fan | |
| 7,202,607 B2 | 4/2007 | Kazar et al. | |
| 7,210,818 B2 | 5/2007 | Luk et al. | |
| 7,425,088 B2 | 9/2008 | Weitzel | |
| 7,604,361 B2 | 10/2009 | Pohlert et al. | |
| 7,988,332 B2 | 8/2011 | Lo et al. | |
| 9,228,732 B2 * | 1/2016 | Li | F21V 23/001 |
| 10,041,637 B2 * | 8/2018 | Yang | H01L 27/156 |
| 2007/0263385 A1 | 11/2007 | Fan | |
| 2008/0079012 A1 | 4/2008 | Grote et al. | |
| 2008/0080200 A1 | 4/2008 | Robbins et al. | |
| 2009/0051517 A1 * | 2/2009 | Suzuki | B60Q 1/323 |
| | | | 340/438 |
| 2009/0251894 A1 * | 10/2009 | Tsai | F21S 4/26 |
| | | | 362/219 |
| 2010/0008090 A1 * | 1/2010 | Li | F21V 17/007 |
| | | | 362/249.03 |
| 2011/0050120 A1 | 3/2011 | Leung et al. | |
| 2011/0211357 A1 | 9/2011 | Preuschl et al. | |
| 2011/0255276 A1 | 10/2011 | Coward | |
| 2011/0309746 A1 | 12/2011 | Eckel et al. | |
| 2012/0242234 A1 | 9/2012 | Long et al. | |
| 2013/0107514 A1 * | 5/2013 | McNabb | F21V 21/00 |
| | | | 362/231 |
| 2015/0070871 A1 * | 3/2015 | Chen | F21K 9/27 |
| | | | 362/84 |

OTHER PUBLICATIONS http://trumplighting.en.made-in-china.com/product/CoZQkjvGPNWs/China-SMD-5-050-PU-Waterproof-Christmas-Flexible-LED-Strip-Light.html (and similar pages on this website), Shenzhen Trump Lighting Technology Co., Ltd., SMD 5050 PU Waterproof Christmas Christmas Flexible LED Strip Light--date retrieved Dec. 19, 2011.
http://www.cryon.com/c-8-strip-linear-lights.aspx (and similar pages on this website), CYRON Lighting Strip-Linear lighting products--date retrieved Mar. 26, 2013.
http://www.grote.com/LightForm/Product.html (and similar pages on this website), LightForm Flexible LED Strips lighting products--date retrieved Mar. 26, 2013.
http://www.alpena.ca/category.aspx?catid=31 (and similar pages on this website), Alpena Flex LEDZ--date retrieved Mar. 26, 2013.
http://www.streetfxseries.com (and similar pages on this website), Home Page, StreetFX--date retrieved Mar. 26, 2013.
http://www.kuryakyn.com/Goldwing/Lighting (and similar pages on this website), Kuryakyn Lighting--date retrieved Mar. 26, 2013.
http://www.customdynamics.com/courtesy.sub.--lights.htm (and similar pages on this website), Custom Dynamics.RTM. LEDS, Motorcycle LED Accent Lights Kits--date retrieved Mar. 26, 2013.
http://www.boogey.com (and similar pages on this website), Boogey Lights.RTM., Boogey Lights Motorcycle LED Lights--date retrieved Mar. 26, 2013.
http://www.chromeglow.com/store.asp?pid=6746&catid=19650 (and similar pages on this website), Chrom Glow LED Accent Lighting, Motorcycle LED Lights--date retrieved Mar. 26, 2013.
http://www.ledaccentlights.net/store/index.php?main.sub.--page=index&cPath-=45 (and similar pages on this website), LED Accent Lights, Multi-Color Motorcycle Kits--date retrieved Mar. 26, 2013.
http://www.radiantz.com/index1.htm?c34.html&1 (and similar pages on this website), Radiantz LED Lighting--date retrieved Mar. 27, 2013.

* cited by examiner

LIGHT EMITTING DIODE LIGHTING SYSTEM

CROSS-REFERENCE TO RELATED APPLICATIONS

This application is a continuation of prior application Ser. No. 13/426,772, filed Mar. 22, 2012. This application claims priority to application Ser. No. 13/426,772, the entirety of which is hereby incorporated by reference.

BACKGROUND

The automotive industry is served with a broad offering of light emitting diode (LED) lighting products for conventional 12 volt vehicular electrical systems. Some of these products include LED light strips, LED light pods, LED light bars, and LED light assemblies that are configured for a variety of uses. Many conventional LED light strips claim flexibility and are flexible on one plane. This allows them to be mounted on a surface with a mono-directional curve. Other types of automotive LED lighting products such as LED light pods and LED light bars are manufactured with rigid housings that encase the LEDs. Such housings include any number or configuration of LEDs.

Most of the products currently available on the market accept a supply voltage of 12 V DC. To protect the LEDs from overvoltage and thermal runaway, the LEDs in conventional products are placed on a printed circuit board in a series of three LEDs, followed by a resistor to control the current passing through the LEDs. This is necessary due to the very sensitive nature of LEDs and their susceptibility to thermal runaway and failure due to overheating.

The present disclosure contemplates that an LED is a diode and its voltage versus current characteristics are similar to other diodes in that the forward current is an exponential function of the forward voltage so that a small change in forward voltage can result in a large change in the forward current. For example, a conventional red 1206 LED may have an allowable DC forward current of 20 mA and a forward DC voltage of 1.9 V. However, if the forward voltage is increased to 2.1 V the forward current may increase to 50 mA, far exceeding the maximum allowable forward current for the LED. As the forward current increases beyond the maximum allowable limit, the LED will overheat causing the LED's voltage drop to decrease and causing more current to pass through the LED. This starts the cycle known as thermal runaway that quickly leads to the overheating and destruction of the LED. Traditionally, current limiting is the preferred method to control thermal runaway.

While conventional manufacturers have deemed this form of current control adequate, there are several concerns regarding this method, as follows:

1. The internal circuits of conventional systems have a fixed resistance chosen based on the belief that automotive systems operate on 12 V. The formula for calculating the resistance value is as follows:

$$R = \frac{(V_S - V_L)}{I}$$

where R is the resistor value, $V_s$ is the supply voltage, $V_L$ is the LED forward voltage, and I is the LED forward current. For example, if a device uses three red LEDs with a forward voltage of 1.9 V DC and a forward DC current of 20 mA in series with a supply voltage of 12 V, the circuit would require a 330 ohm resistor. However, automotive electrical systems do not maintain a constant 12V DC. Due to variations in loads, battery conditions, alternator output performance and other conditions, it is not uncommon to see variances from 8V DC to 16V DC and transient load dumps up to 120 V DC in conventional automotive systems. The supply voltage to the LED lighting device can vary widely due to functions such as turning headlights on and off, activating the starter, engaging and disengaging air conditioning compressors, engine RPMs, and other changes to the loading/charging of the electrical system. In the example given above, if the same circuit with three red LEDs were to receive a supply voltage of 8 V DC, the required resistor would be 120 ohms, which is a significant difference from the 330 ohm resistor that was chosen. The result would be dim and uneven lighting of the LEDs. In the same system, if the supply voltage was to be 16 V DC, the required resistor would be 560 ohms. However, since the chosen resistor was 330 ohms, the system would not have the needed current control and would be at risk for shortened LED life and/or thermal runaway.

2. The use of resistors (in conventional systems) internally to control current reduces the efficiency of the circuit in that the resistors take the excess current and turn it into heat. In many cases, hundreds and sometimes thousands of LEDs are used in accent lighting in the automotive applications. The increase draw on the automotive electrical systems can be detrimental. Many times accent lighting is turned on when the vehicle is not running and, therefore, the automobile battery is not being recharged. Increasing the current draw through the LED lighting devices by way of using resistors to limit current can shorten the span of time that the accent lights can be left on without draining the battery.

3. Conventional lighting devices have no protection against transient load dumping. Transient load dumps can be as high as 120 V DC and take up to 400 ms to decay. This kind of spike has been known to easily damage LEDs.

4. Conventionally, the need for internal regulation of current complicates the construction of such lighting devices and limits how small and discreet the devices can be made. The use of printed circuit boards (either flexible or rigid) also causes the devices to be opaque, and a need to hide the circuitry arises if the device is going to be in plain view. In the case of a flexible LED light strip that uses a conventional flexible printed circuit board internally, the strip is limited to flexing only on one plane because of the planer nature of the conventional flexible printed circuit board.

5. In the case of a conventional LED light strip that can be cut to length when a circuit of three LEDs and a resistor are used, the strip can only be cut in intervals of three LEDs. If the strip is cut anywhere within the three LEDs and resistor circuit, the circuit is broken and all three LEDs stop functioning.

Some conventional systems are directed to methods for arranging LEDs in parallel. However, they do not address a method for controlling thermal runaway or a condition known as load hogging or current hogging that occurs in parallel configurations of LEDs. When LEDs in conventional systems are arrayed in a parallel manner and the source current is limited to the total forward current of the string of LEDs, current hogging or load hogging occurs because of small variations in the LEDs. One or more LEDs will start to consume more current than others in the array. This causes unevenness in light output, and as the LEDs start to pass more current the forward voltage drop will decrease allowing more current to pass through the LED. This will continue until the LEDs that are hogging the current experience thermal runaway and are destroyed by overheating. After this occurs, excessive current is available to the remaining LEDs which quickly causes thermal runaway to incur in the remaining LEDs, destroying them as well.

While there are some conventional systems with a parallel array of LEDs, there is no solution to the light strip being flexible on more than one axis. Because of the geometry of having parallel buses of a fixed length affixed to the LEDs in conventional systems, the LED lighting device will be able to flex about one axis along its length. However, if the conventional LED lighting device is flexed about a second axis the electrical bus on the outside of the radius breaks due to the need to elongate to accommodate the increased distance as a result of the curvature. For example, if an LED light strip is arranged in such a way that its length is along the Y axis, its width is along the X axis, and its height is along the Z axis such that its total length is 200 mm and the distance between the buses is 3.5 mm, it is easily flexed about the X axis without damage to the electrical buses because the electrical buses are coplanar along the Y axis. However, if it is flexed about the Z axis with a 100 mm radius the inner bus would need to decrease and the length of the outer bus would need to increase. This is not possible in conventional systems because the buses effectively create a parallelogram and the buses are no longer coplanar. The length of the inner bus would need to decrease and the length of the outer bus would need to increase. Having two electrical buses of a fixed length electrically connected to LEDs in a parallel fashion effectively creates a light strip with a planer nature comparable to products that are manufactured on a flexible printed circuit board.

This planer nature and the ability to only flex about one axis along the length of the light strip limits the ability of the conventional lighting devices to be conformably mounted to surfaces with compound curvatures. Many automotive applications require mounting on surfaces of compound curvatures.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

In the drawings.

DETAILED DESCRIPTION

Figure 1:
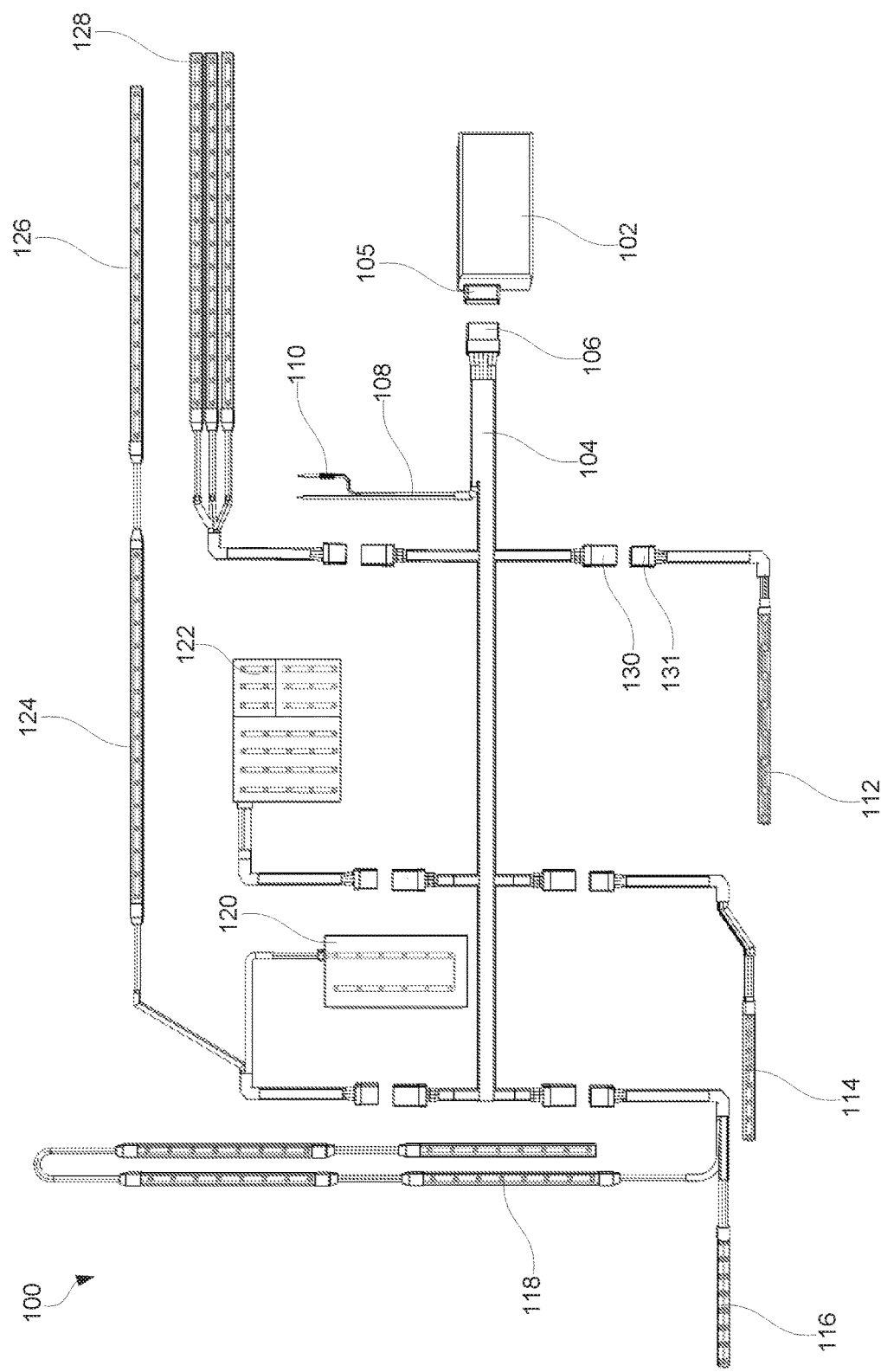
FIG. 1 depicts an example lighting system.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, may be arranged, substituted, combined, and designed in a wide variety of different configurations, all of which are explicitly contemplated and make part of this disclosure.

This disclosure is drawn to methods, systems, devices and/or apparatus related to lighting systems for various applications. Specifically, some of the disclosed methods, systems, devices and/or apparatus relate to LED lighting systems for motorcycles, automobiles and commercial vehicles, flashing indicator lights for law enforcement and emergency vehicles, and/or indicator lights for the automotive industry including marker lights, turn signals, stop, back-up and tail lights.

In an example embodiment, the lighting system may include an LED light strip or plane, a power supply control box, and a wire harness.

In some examples, as depicted in FIG. 1, the lighting system 100 may include a power supply control box 102 coupled to a wire harness 104 via a multi-pin connector 106. The power supply control box 102 may receive a source voltage through positive and negative lead wires 108 that may be coupled to an external power source (e.g. an automotive battery). The lighting system 100 may include an inline fuse 110 interposed in the positive lead wire between the external power source and the wire harness 104. The wire harness 104 may serve as an interconnection between the LED lighting devices 112, 114, 116, 118, 120, 122, 124, 126, 128 and the power supply control box 102. The wire harness 104 may be constructed of a flexible sheathed conduit along its length with branches of varying lengths placed at different points along the length of the wire harness 104. The wire harness 104 may be configured to carry a single channel or multiple channels and may correspond to the number of outputs from the power supply control box 102. At the end of each of the wire harness branch there may be a multi-pin waterproof connector(s) 130, whose number of pins corresponds to the number of outputs of the control box power supply 102. Each of the LED lighting device(s) 112, 114, 116, 118, 120, 122, 124, 126, 128 may be removably connected to the wire harness 104 with the use of a corresponding multi-pin waterproof connector 130. Each LED lighting device 112, 114, 116, 118, 120, 122, 124, 126, 128 include one or more mating connector 131 for coupling to a corresponding multi-pin waterproof connector 130.

The LED lighting device(s) 112, 114, 116, 118, 120, 122, 124, 126, 128 may include a single color flexible light strip. Multiple single color LED light strips 128 may be connected and may be controlled independently so as long as there are available channels at the connector. For example, if the control box power supply 102 has two outputs, two LED lighting devices may be controlled independently at each connector. If the control box power supply 102 has three outputs, three LED lighting devices may be controlled independently. Two or more LED light strips 124, 126 may be connected together in a string so long as there is only one 1 ohm resistor in the string and the combined current draw of the LED light strips 124, 126 does not exceed the max current allowable for the electrical buses in the first LED light strip. The LED light strings may also be configured as bi-color strips either dual row 116 or single row 118 or 3-color RGB strips 112. The LED lighting device may also be configured in a planer nature either single color such as a marker light 120 and/or multi-color such as a stop, turn, tail, reverse light 122.

Figure 2:
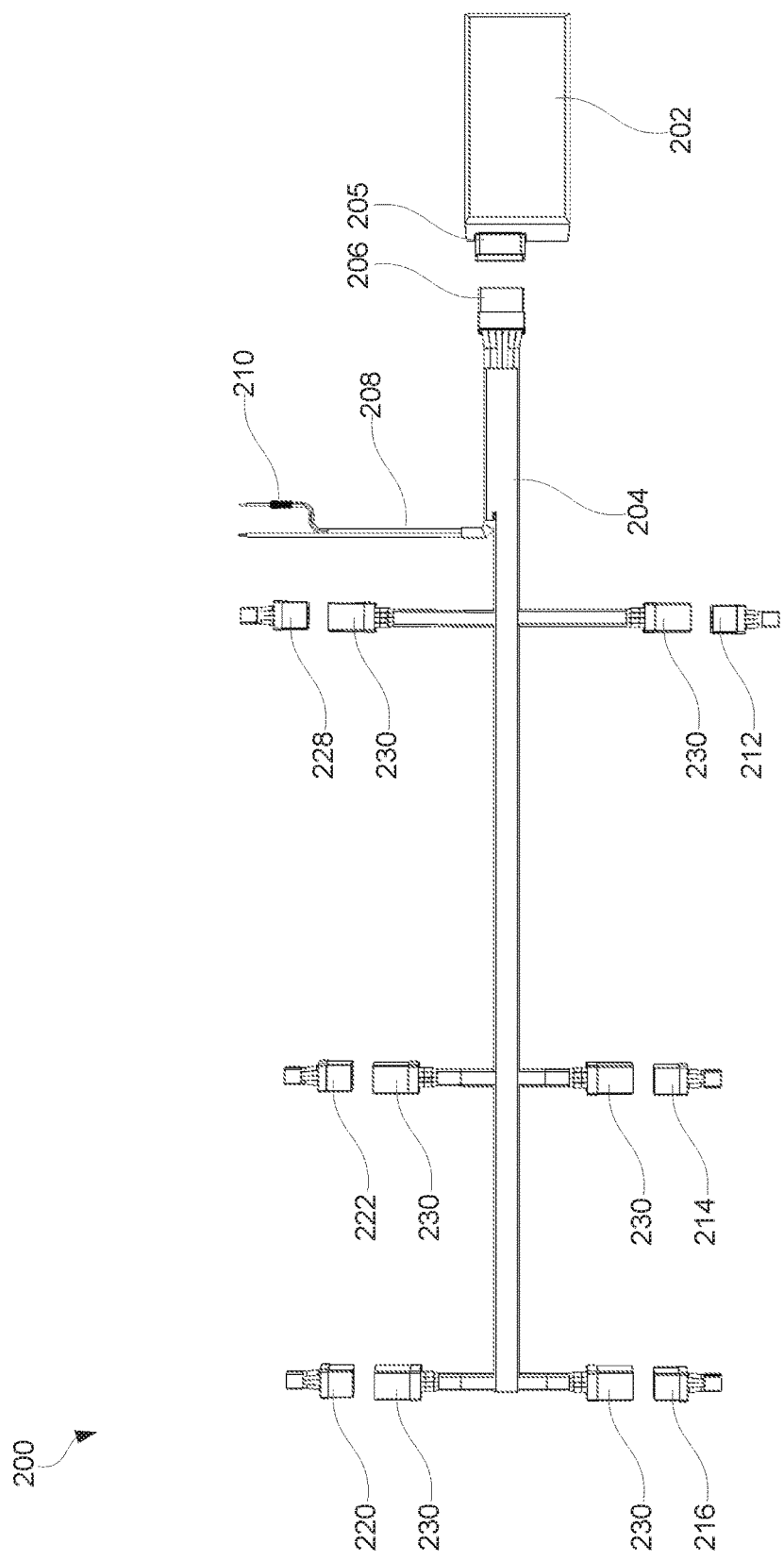
FIG. 2 depicts another example lighting system.

In some examples, as depicted in FIG. 2, the lighting system 200 may include a power supply control box 202 coupled to a wire harness 204 via a multi-pin connector 206. FIG. 2 depicts a 3-output (channel) system such that the power supply control box 202 includes a six pin waterproof connector 205 that houses pins for a positive and negative input, a common negative output and three positive output pins for a total of six pins. The wire harness 204 may have a mating 6 pin waterproof connector 206 such that the power supply control box 202 may be removably connected from the wire harness 204. The connectors 230 along the length of the wire harness at the end of the wire harness branches may then have four pins: 1 common negative and 3 positive output pins. There may be a mating 4 pin connector (105) connected to the LED lighting device(s) 212, 214, 216, 218, 220, 222, 224, 226, 228 such that the LED lighting device 212, 214, 216, 218, 220, 222, 224, 226, 228 may be removably connected to the wire harness 204.

Figure 3A:
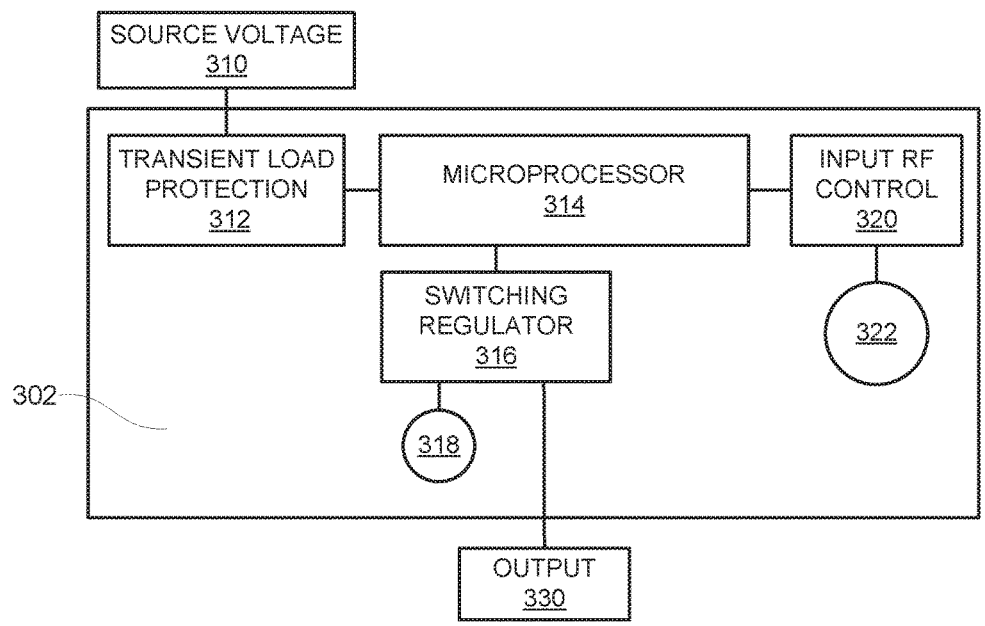
FIGS. 3A, 3B, 4A and 4B depict schematic views of several example lighting systems.
Figure 3B:
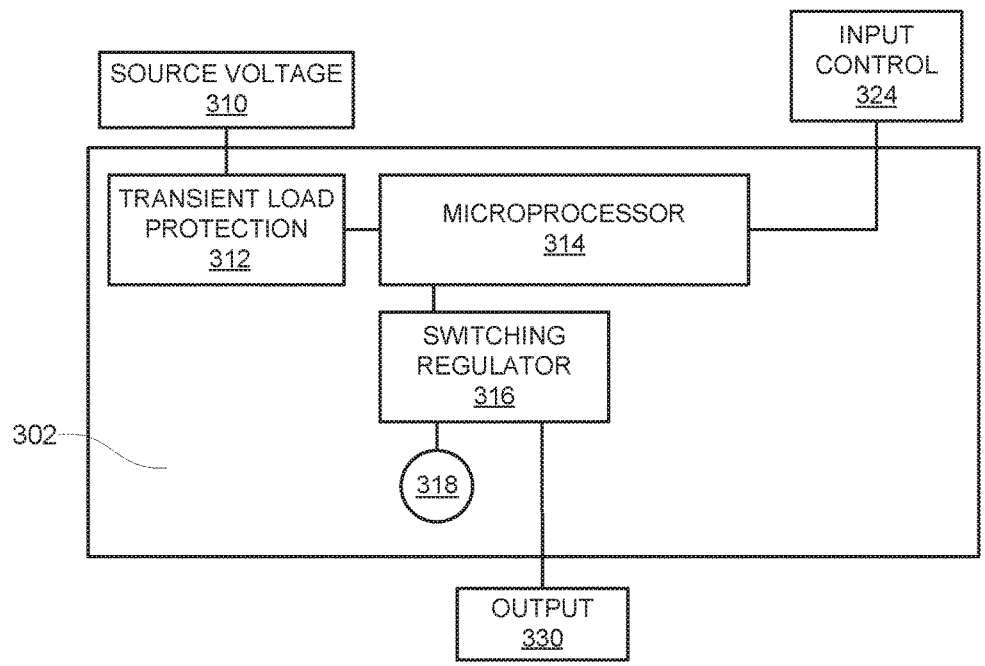

In some examples, as schematically depicted in FIGS. 3A and 3B, the power supply control box 302 may include inputs for the source voltage 310, transient load protection 312, a microprocessor 314, a high accuracy switching voltage regulator 316, a trimming adjusting potentiometer 318, and output(s) 330. FIG. 3A depicts an example single channel radio frequency (RF) remote controlled power supply control box 302, which includes an RF receiver and control 320, 322. FIG. 3B depicts an example single channel direct controlled power supply control box 302, which includes a direct input 324 from a switch panel or related device instead of receiving input commands through an RF remote.

In some examples, the power supply control box 302 may provide transient load protection 312 to the internal circuitry, the wire harness and the LED lighting devices. The microprocessor 314 may receive input commands from the RF receiver and control 320, 322 which may in turn receive commands from an RF transmitter (e.g., key fob remote transmitter). The microprocessor 314 may be programmed to provide various output patterns to the switching regulator 316 as desired by the operator to perform functions such as dimming, fading, flashing, blinking and/or mixing of channels based on the input commands from the transmitter via the input control 320, 322. The microprocessor 314 may transmit commands (e.g., on/off commands) to the voltage regulator 316. Example voltage regulators 316 may include a high accuracy Simple Switcher® controller such as Texas Instruments' LM3150 synchronous step down power controller and Texas Instruments' LM22678 synchronous step down power controller, among others.

The voltage regulator 316 may be configured to provide an adjustable output voltage from 1.5 V DC to 4 V DC with accuracy of ±1%. The voltage regulator 316 circuitry may include an adjusting potentiometer 318 to make precise adjustments to the output voltage from 1.5 V DC to 4 V DC so as to match the output voltage with the desired forward voltage of the LED lighting device connected to the power supply control box 302 via a wire harness. For example, a red or yellow LED lighting device may require a forward voltage of 1.9 V DC while a blue or green LED lighting device may require a forward voltage of 3.2 V DC. Further, the trimming potentiometer 318 may adjust the output voltage as needed to accommodate voltage drop through the wire harness and connectors.

Figure 4A:
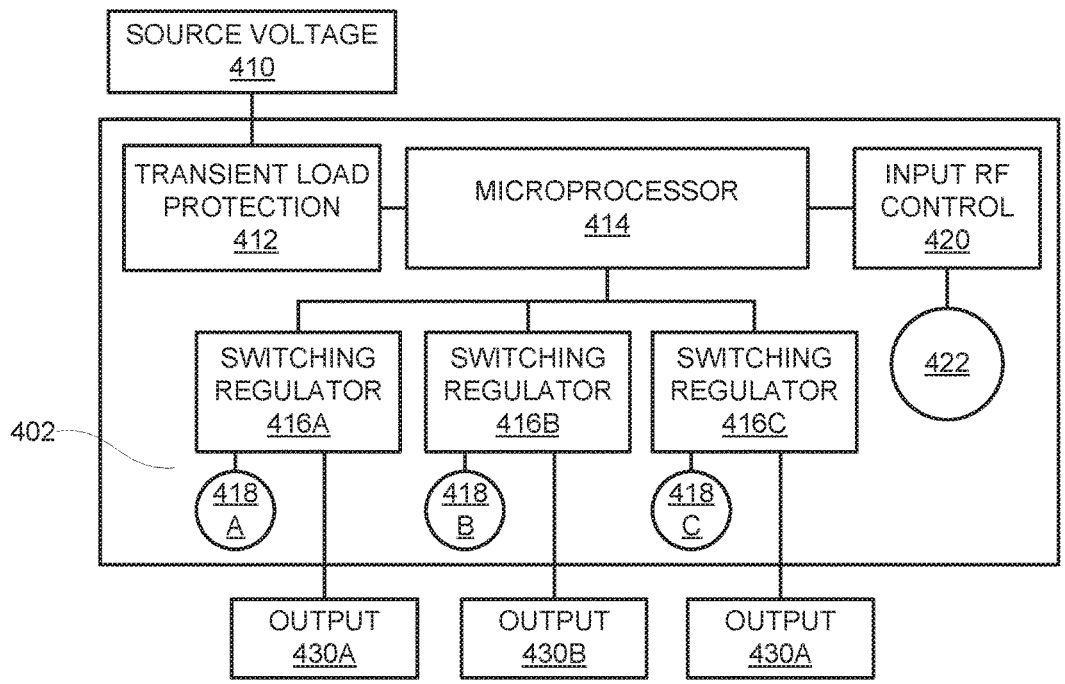
Figure 4B:
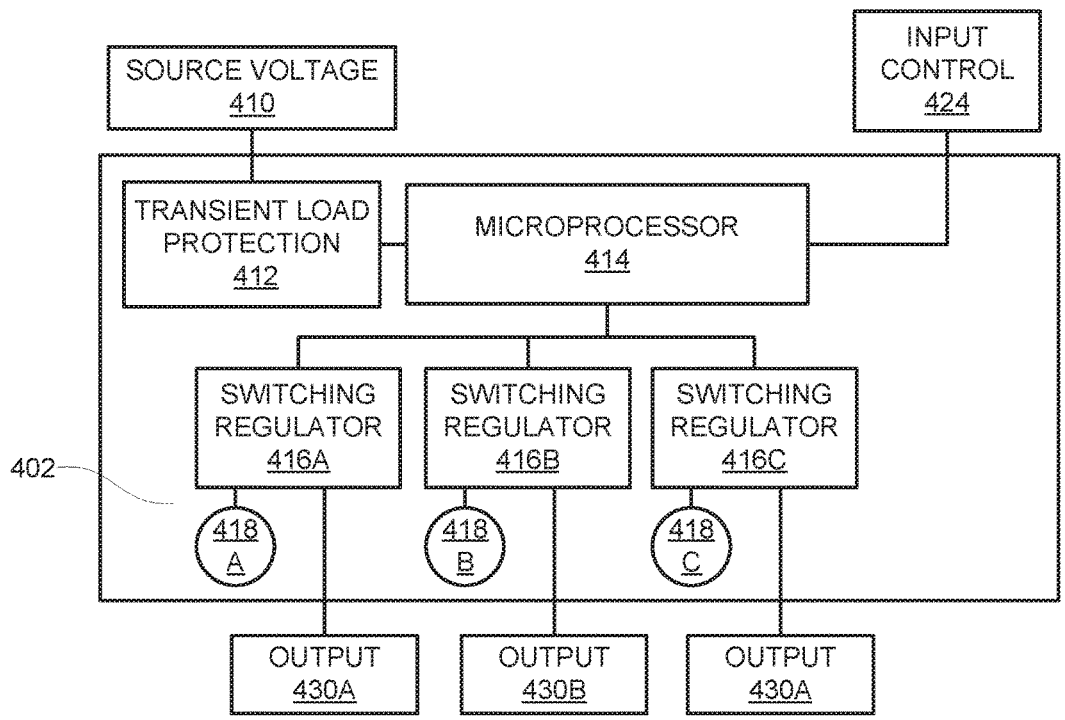

In some examples, as schematically depicted in FIGS. 4A and 4B, the power supply control box 402 may include inputs for the source voltage 410, transient load protection 412, a microprocessor 414, switching voltage regulators 416A, 416B, 416C, trimming adjusting potentiometers 418A, 418B, 418C, and outputs 430A, 430B, 430C.

FIG. 4A depicts an example three channel RF remote controlled power supply control box 402, which includes an RF receiver and control 420, 422. FIG. 4A depicts a configuration with RF remote control inputs 420, 422 and three independently controlled output channels 430A, 430B, 430C. This may be an example configuration for 3-zone lighting systems or RGB lighting systems. Each output 430A, 430B, 430C may be independently controlled by the microprocessor 414 and the output voltage may also be adjusted independently via switching voltage regulators 416A 416B, 416C and/or trimming adjusting potentiometers 418A, 418B, 418C.

FIG. 4B depicts an example three channel direct controlled power supply control box 402, which includes a direct input 424 from a switch panel or related device instead of receiving input commands through an RF remote. FIG. 4B depicts an example three channel configuration with direct input from a switch panel or related device instead of receiving input commands through RF remote.

Figure 5:
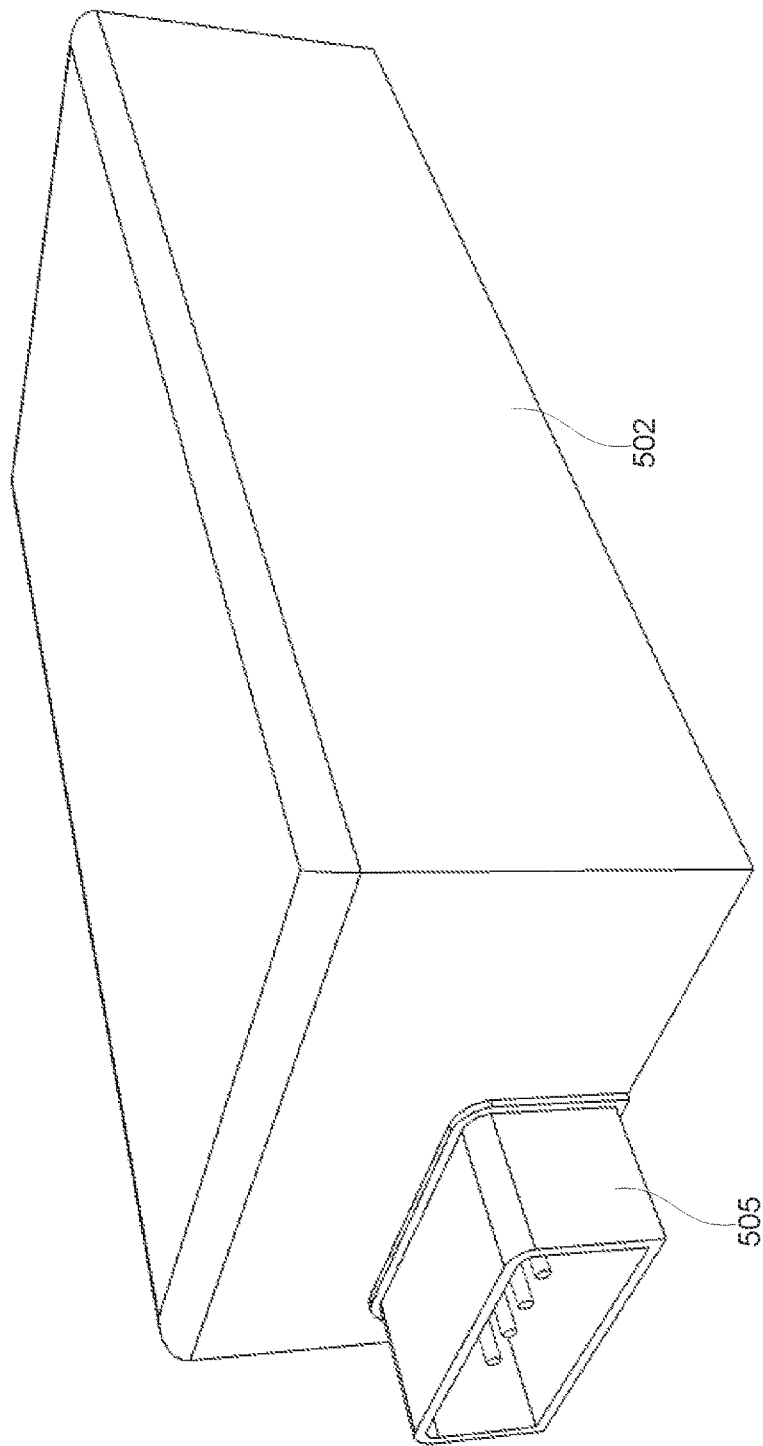
FIG. 5 depicts an example control component.

In some examples, as depicted in FIG. 5, the power supply control box 502 may include an enclosure (e.g., plastic) and a multi-pin mating connector 505 to be coupled to the wire harness.

Figure 6A:
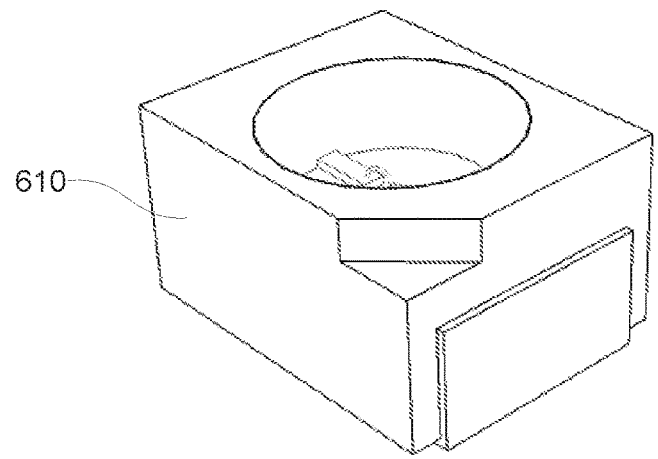
FIGS. 6A, 6B and 6C depict several example light emitting diodes.
Figure 6B:
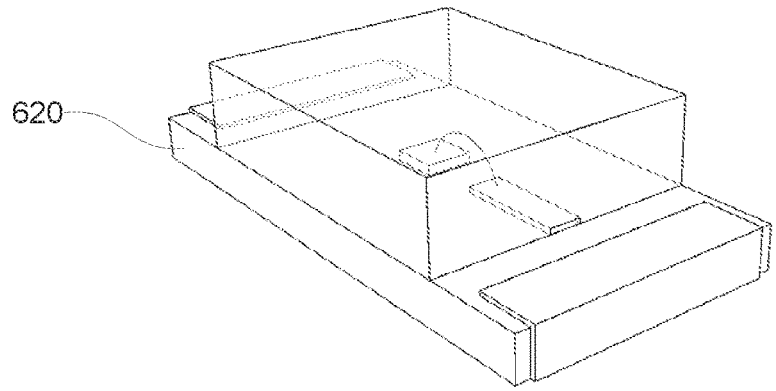
Figure 6C:
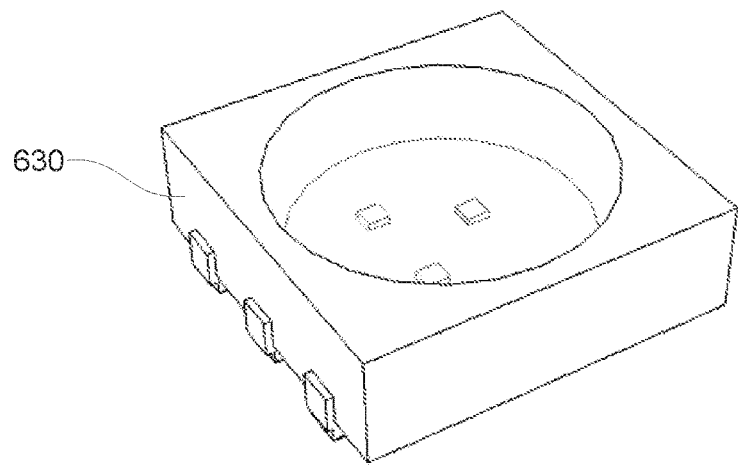

It should be noted that any LEDs may be used in various embodiments. In some examples, as depicted in FIGS. 6A, 6B and 6C, LEDs may include a surface-mount (SMT) LED with a package case of Plastic Leaded Chip Carrier 2 (PLCC2) 610, SMT LED with a package case of 1206 620, and/or SMT LED with an RGB configuration in a package case of Plastic Leaded Chip Carrier (PLCC) 630. The present disclosure contemplates that other LEDs (e.g., SMT LED with a package case of 0805) may also be used.

Figure 7:
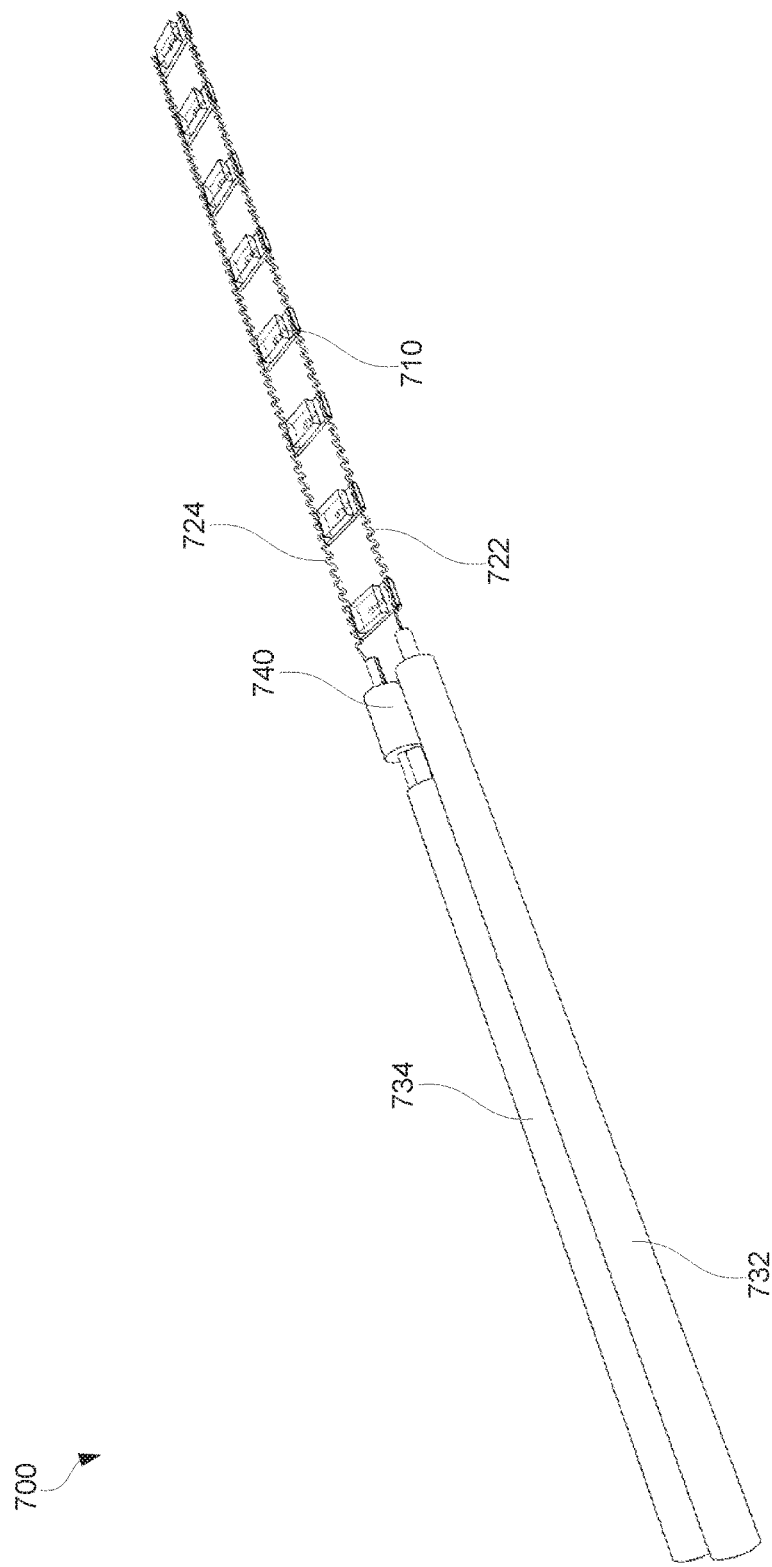
FIGS. 7-11 depict several example lighting systems.

In some examples, as depicted in FIG. 7, a flexible LED light strip 700 may include SMT LEDs with a package case of 1206 710 arrayed in a parallel manner between a negative electrical bus 722 and a positive electrical bus 724 that are roughly parallel and attached to the LEDs 710 by means of solder, ultrasonic weld and/or electrically conductive adhesive. For the sake of clarity, this Figure does not include a resin-based enclosure/encasement. The negative electrical bus 722 may be electrically connected to the negative wire lead 732 and the positive electrical bus 724 may be connected to the positive wire lead 734. A resistor 740 (e.g., 1 ohm, ¼ watt) may be interposed between the positive wire lead 734 and the positive electrical bus 724. One having ordinary skill in the art would know the type(s), values(s), size(s) and/or other characteristics of example resistor(s) that may be applicable in various embodiments.

In some examples, the electrical buses 722, 724 may be constructed of bare solid and/or stranded wire and may be formed into a wave shape (e.g., continuous sine wave) such that the amplitude of the wave does not exceed the height of the LED 710 and the frequency of the wave is such that there are several complete wave forms between each LED 710 in the array. The number of LEDs 710 in the array and the distance between the LEDs 710 in the array may vary greatly depending on desired lighting output and desired level of flexibility. The LED light strip 700 may increase in flexibility with an increase of full waves between the LEDs 710 in the array. The electrical buses 722, 724 may be comprised of wire from 20 to 34 AWG depending on the desired current carrying capacity. The positive electrical bus 724 may be electrically connected to the anode side of the LED 710 such that the wave form of the electrical bus 724 is vertical so as to not substantially increase the width of the LED light strip 700. The negative electrical bus 722 may be electrically connected to the cathode side of the LED 710 such that the wave form of the electrical bus 722 is vertical so as to not substantially increase the width of the LED light strip 700.

Figure 8:
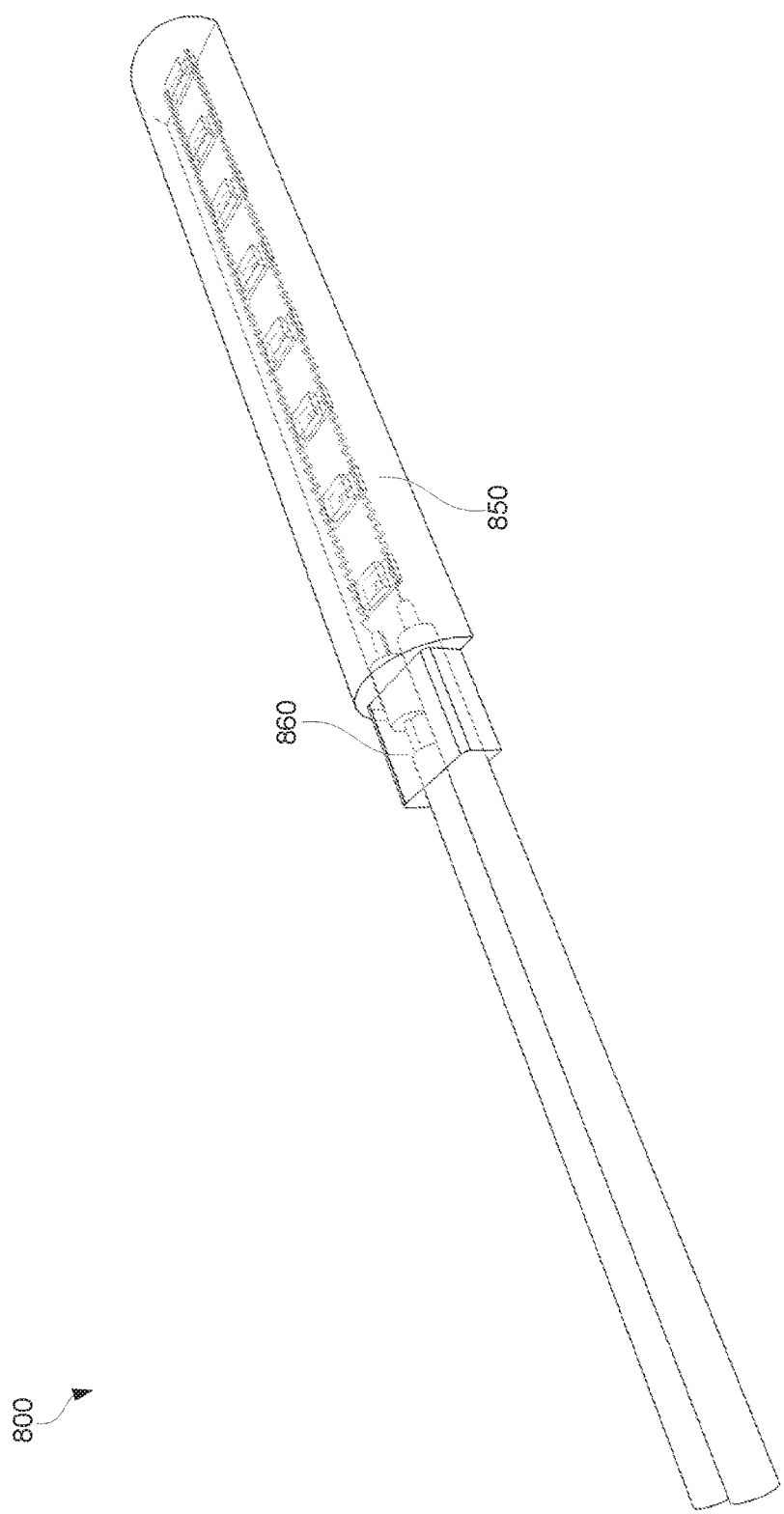

In some examples, as depicted in FIG. 8, a flexible LED light strip 800 may include 1206 LEDs encased in a half-round profile resin-based encasement 850 and an additional extrusion 860 of resin extending from the end of the half round encasement 850 covering a portion of the resistor and wire leads. In this manner, LEDs, electrical buses, resistor and a portion of the wire leads may be encased in a flexible transparent resin (e.g., a water clear polyurethane elastomer with a shore hardness of approximately 90 A) such that the entirety of the LED string, the resistor, and a portion of the wire leads are completely encased in the resin and impervious to water, moisture, and/or contaminants.

Example resin-based substances may include commonly available products that may be fuel, oil and chemical resistant, that may be tintable, that may maintain clarity in outdoor conditions, and/or remains stable in high temperatures. An example of such resin-based substance is WC series water clear Polyurethanes manufactured by BJB Enterprises.

Figure 9:
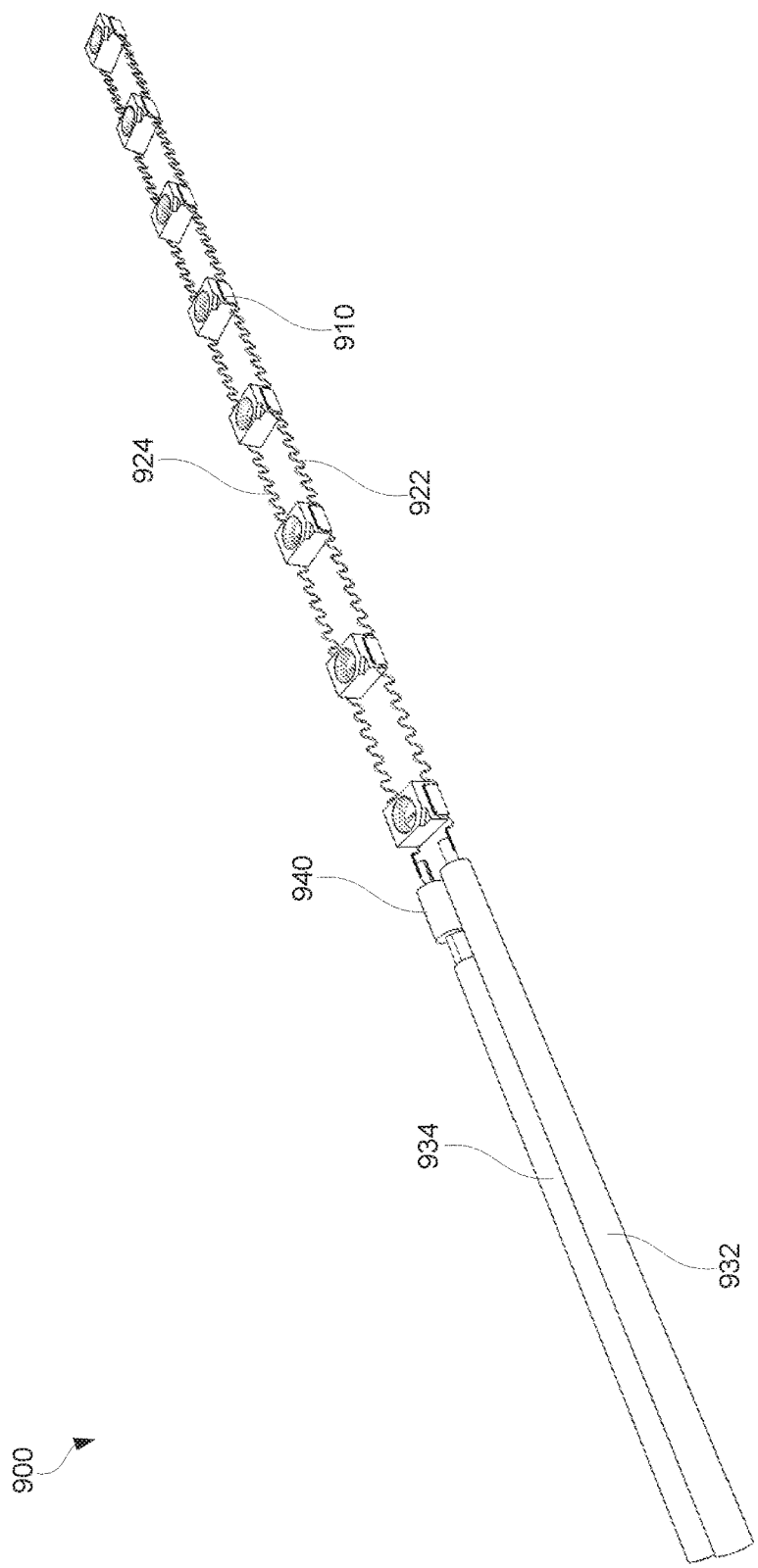

In some examples, as depicted in FIG. 9, a flexible LED light strip 900 may include SMT LEDs with a package case of PLLC2 910 arrayed in a parallel manner between a negative electrical bus 922 and a positive electrical bus 924 that are roughly parallel and attached to the LEDs 910 by means of solder, ultrasonic weld and/or electrically conductive adhesive. For the sake of clarity, this Figure does not include a resin-based enclosure/encasement. The negative electrical bus 922 may be electrically connected to the negative wire lead 932 and the positive electrical bus 924 may be connected to the positive wire lead 934. A resistor 940 may be interposed between the positive wire lead 934 and the positive electrical bus 924.

Figure 10:
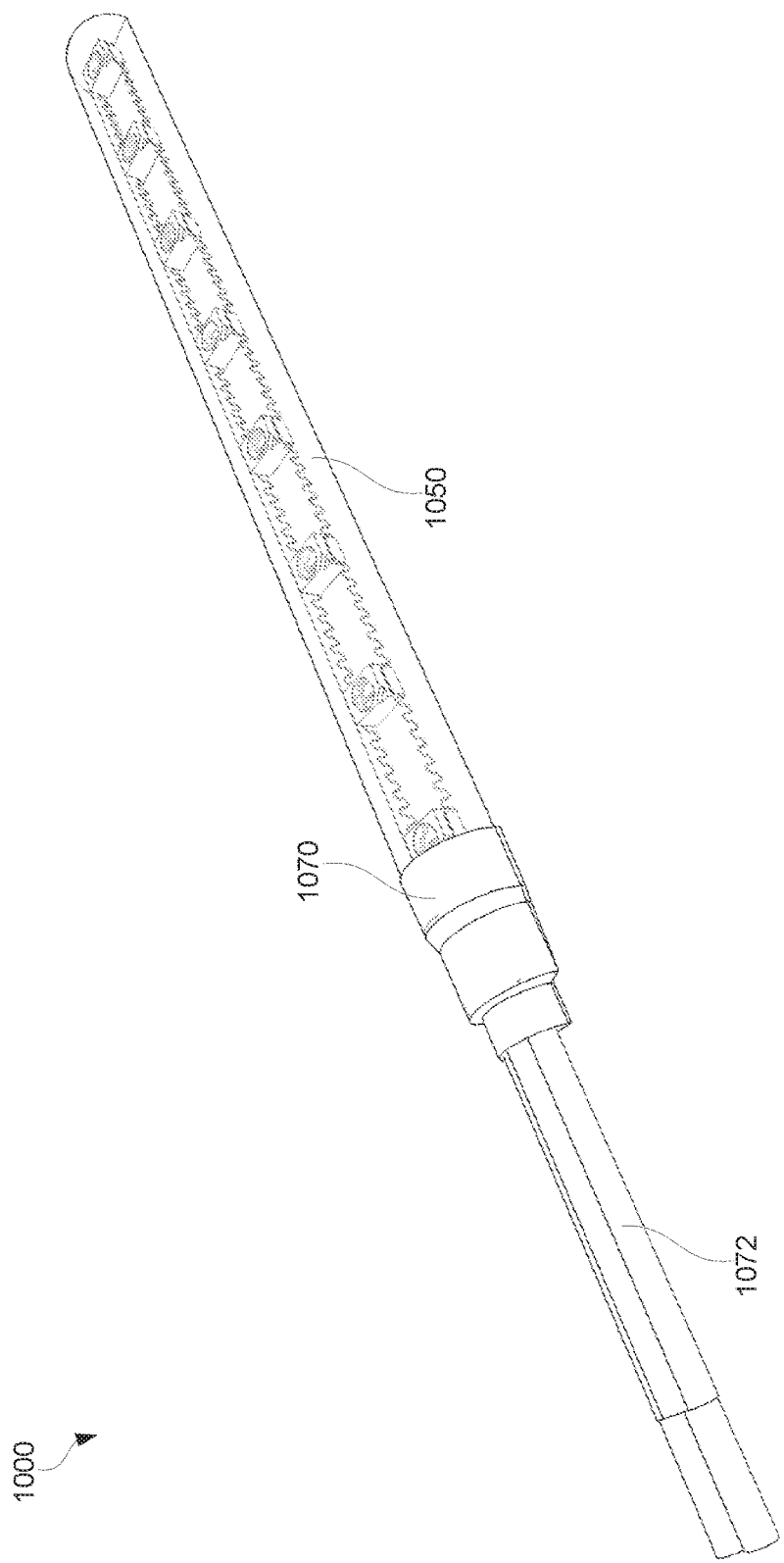

In some examples, as depicted in FIG. 10, a flexible LED light strip 1000 may include PLLC2 LEDs encased in a half-round profile resin-based encasement 1050 and an shrink tube (e.g., adhesive lined shrink tube) 1070 applied to the wire leads and shrink tube (e.g., adhesive lined shrink tube) 1072 applied to the end portion of the resin covering the connection of the wire leads, resistor and additional resin extrusion.

Figure 11:
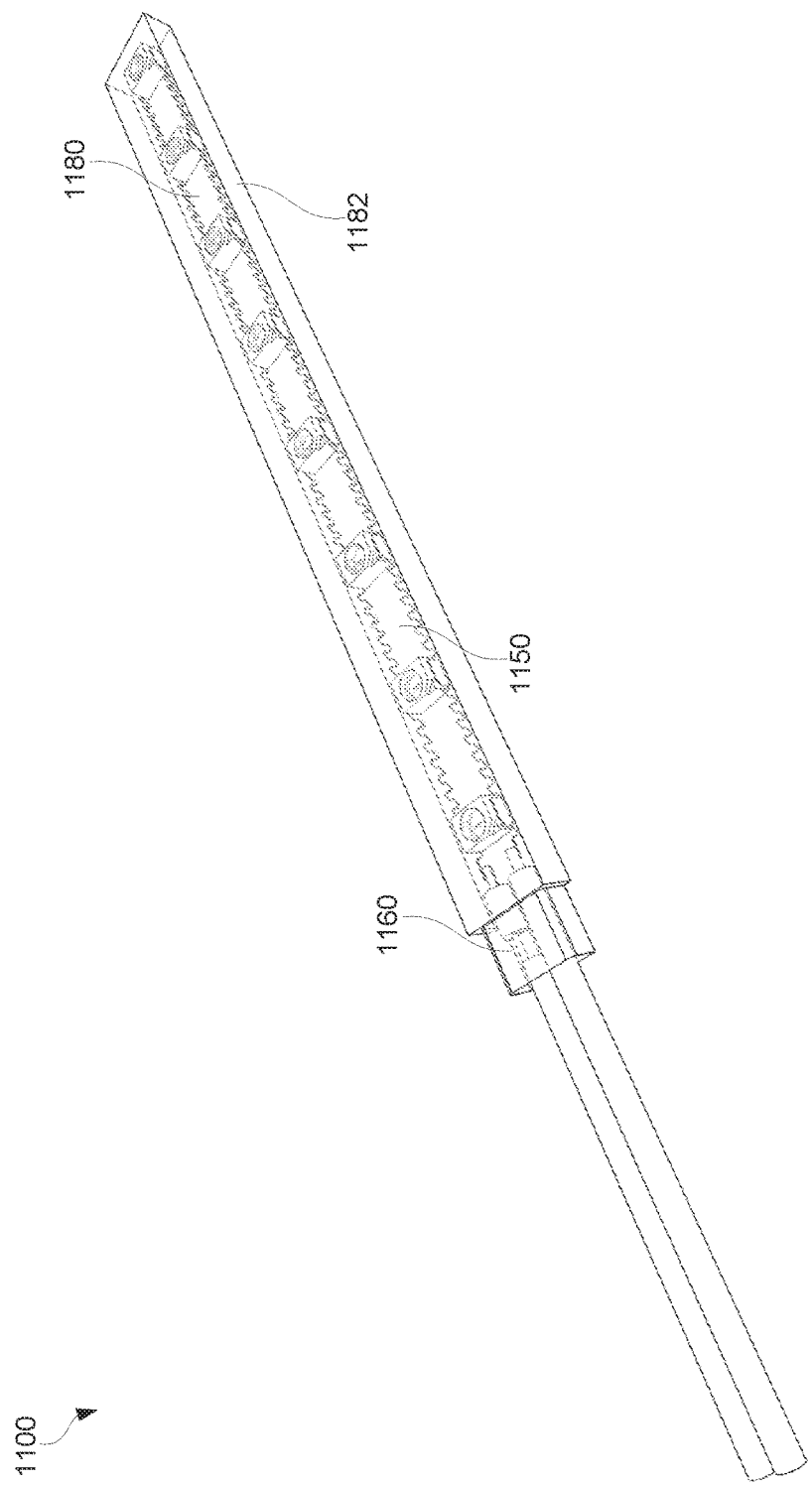

In some examples, as depicted in FIG. 11, a flexible LED light strip 1100 may include PLLC2 LEDs encased in a rectangular profile resin-based encasement 1150 and an additional extrusion 1160 of resin extending from the end of the rectangular encasement 1150 covering a portion of the resistor and wire leads. The rectangular profile allows top lighting (e.g., light emitted from a top surface 1180 of the encasement 1150) and/or edge lighting (e.g., light emitted from a side surface 1182 of the encasement 1150).

Figure 12:
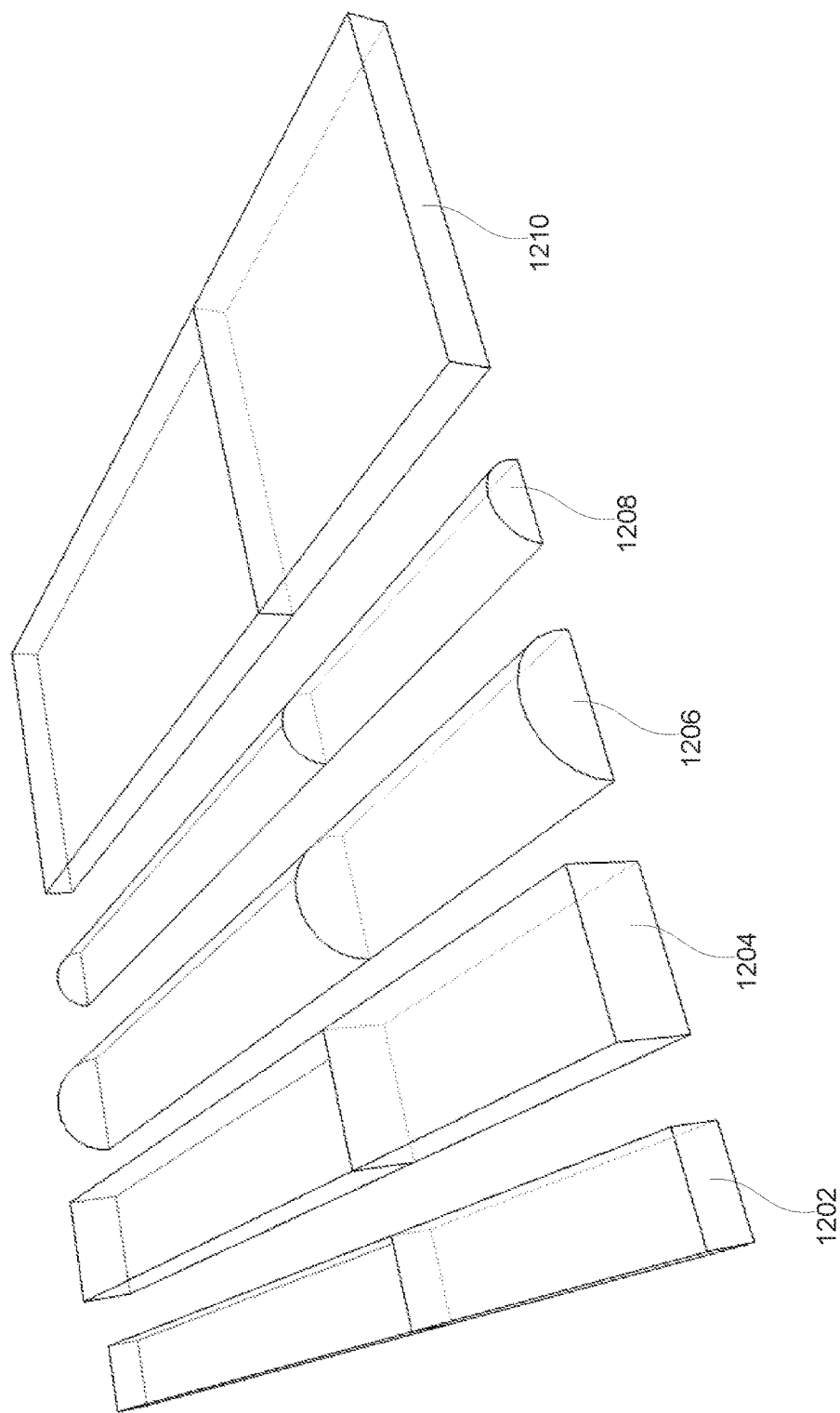
FIG. 12 depicts several example resin-based encasements.

In some examples, as depicted in FIG. 12, flexible resin-based encasements may include various shapes, profiles, sizes and/or surface treatments. Because of the small size and high flexibility of the LED arrays, they may be cast into many different shapes and sizes to suit the desired lighting effect. Example forms may include planer 1210, half round profile strip 1206, 1208, and/or rectangular profile strip 1202, 1204. The resin may be cast in a highly polished mold giving the resin a water clear finish and fully transparent. The resin may be tinted to further manipulate the coloring of the light in some embodiments. The surfaces of the encasements may further be modified such as given a frosted surface texture to diffuse the light and emitting a softer glow look. The planer design 1210 may project the light from the LEDs primarily through the outward-facing surface of the resin. The half round profile 1206, 1208 may project a wider pattern of light. The rectangular profile 1202, 1204 may be mounted to project light out of the top surface, mounted so that only the edge is exposed (i.e., emitting a thin profile of light from the edge), and/or mounted face down so that a more diffused light is emitted from the back surface. The present disclosure contemplates that other shapes, profiles, sizes and/or surface treatments may also be used.

Figure 13:
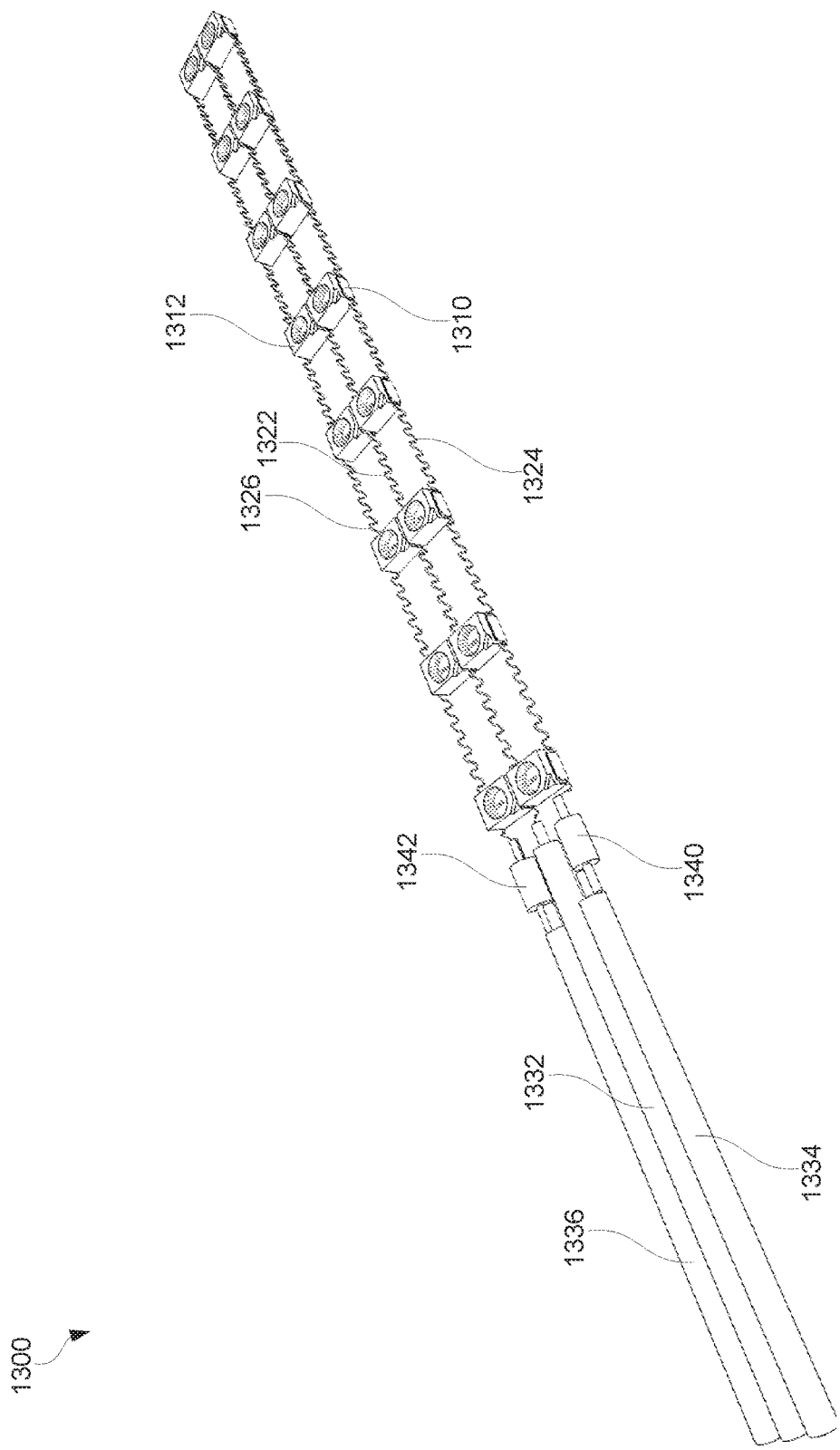
FIGS. 13-31 depict several example lighting systems and components thereof.

In some examples, as depicted in FIG. 13, a flexible bi-color LED light strip 1300 may include two rows of PLCC2 LEDs 1310, 1312 of two different colors arrayed in a parallel manner and sharing a common negative electrical bus 1322. One row of this example LED light strip 1300 may include SMT LEDs 1310 of one color (e.g., red, green, blue) with a package case of PLCC2 arrayed in a parallel manner between a negative electrical bus 1322 and a positive electrical bus 1324 that are roughly parallel and attached to the LEDs 1310 by means of solder, ultrasonic weld, and/or electrically conductive adhesive. The negative electrical bus 1322 may be electrically connected to the negative wire lead 1332 and the positive electrical bus 1324 may be connected to the positive wire lead 1334 with a resistor 1340 (e.g., 1 ohm, ¼ watt) interposed between the positive wire lead 1334 and the positive electrical bus 1324.

In some examples, the electrical buses 1322, 1324 may be constructed of bare solid and/or stranded wire and may be formed into a wave shape (e.g., continuous sine wave) such that the amplitude of the wave does not exceed the height of the LED 1310 and the frequency of the wave is such that there are several complete wave forms between each LED 1310 in the array. The number of LEDs 1310 in the array and the distance between the LEDs 1310 in the array may vary greatly depending on desired lighting output and desired level of flexibility. The LED light strip 1300 may increase in flexibility with an increase of full waves between the LEDs 1310 in the array. The electrical buses 1322, 1324 may be comprised of wire from 20 to 34 AWG depending on the desired current carrying capacity. The positive electrical bus 1324 may be electrically connected to the anode side of the LED 1310 such that the wave form of the electrical bus 1324 is vertical so as to not substantially increase the width of the LED light strip 1300. The negative electrical bus 1322 may be electrically connected to the cathode side of the LED 1310 such that the wave form of the electrical bus 1322 is vertical so as to not substantially increase the width of the LED light strip 1300.

In some examples, such as depicted in FIG. 13, the second row of LEDs (including LED 1312) in light strip 1300 may be configured in much the same way as the first row of LEDs (including LED 1310). The second row of LEDs may share the same negative electrical bus 1322 as the first row. However, the positive electrical bus 1326 may be connected to a separate positive wire lead 1336 with a 1 ohm, ¼ watt resistor 1342 interposed between the positive wire lead 1336 and the positive electrical bus 1326 such that the first row and the second row may be controlled independently.

Figure 14:
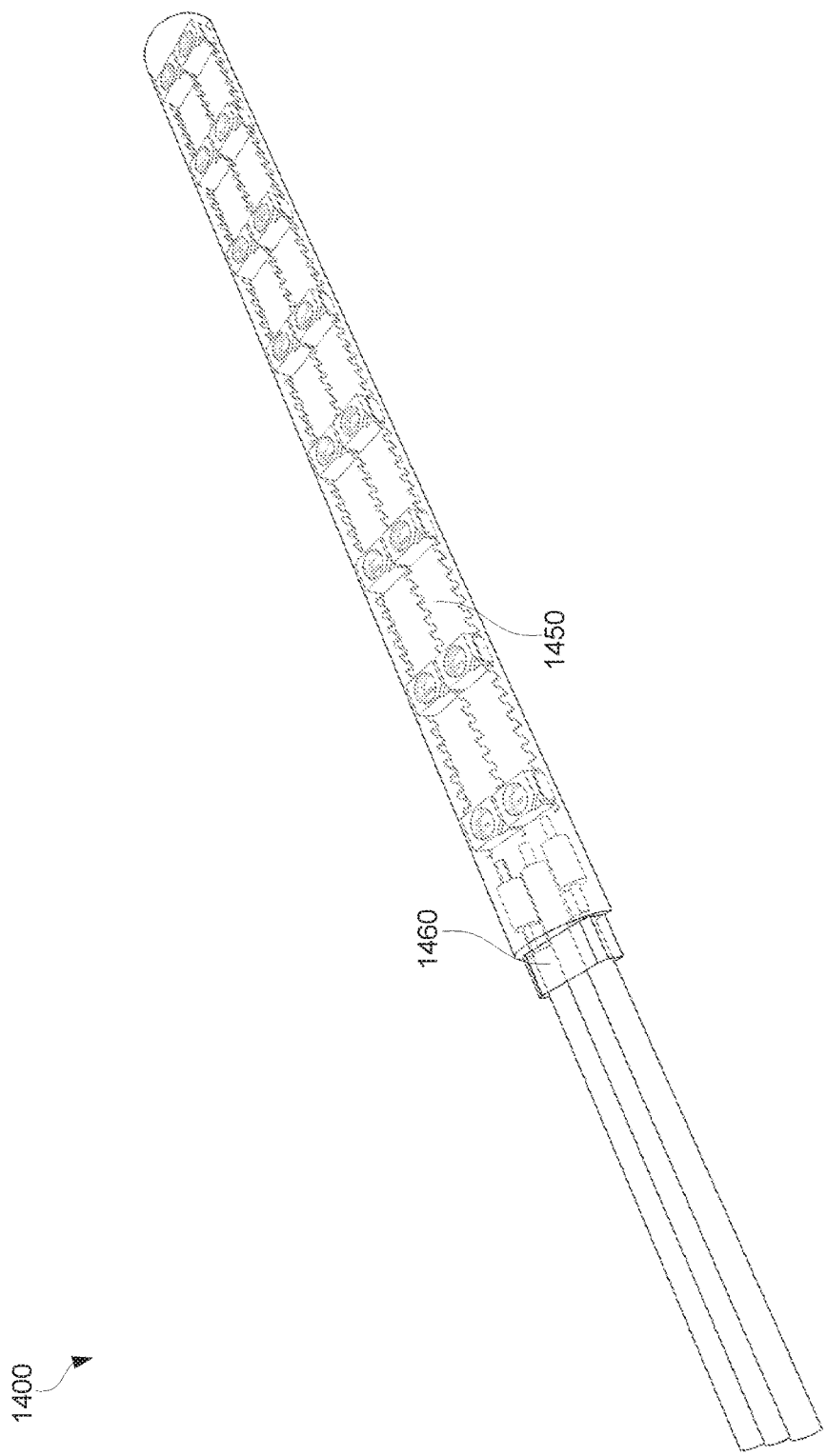

In some examples, as depicted in FIG. 14, a flexible bi-color LED light strip 1400 may include two rows of PLCC2 LEDs of two different colors arrayed in a parallel manner and sharing a common negative electrical bus. At least a portion of the flexible bi-color LED light strip 1400 may be encased in a half-round profile resin-based encasement 1450 and an additional extrusion 1460 of resin extending from the end of the half round encasement 1450 covering a portion of the resistor and wire leads. In this manner, LEDs, electrical buses, resistor and a portion of the wire leads may be encased in a flexible transparent resin (e.g., a water clear polyurethane elastomer with a shore hardness of approximately 90 A) such that the entirety of the LED string, the resistor, and a portion of the wire leads are completely encased in the resin and impervious to water, moisture, and/or contaminants.

Figure 15:
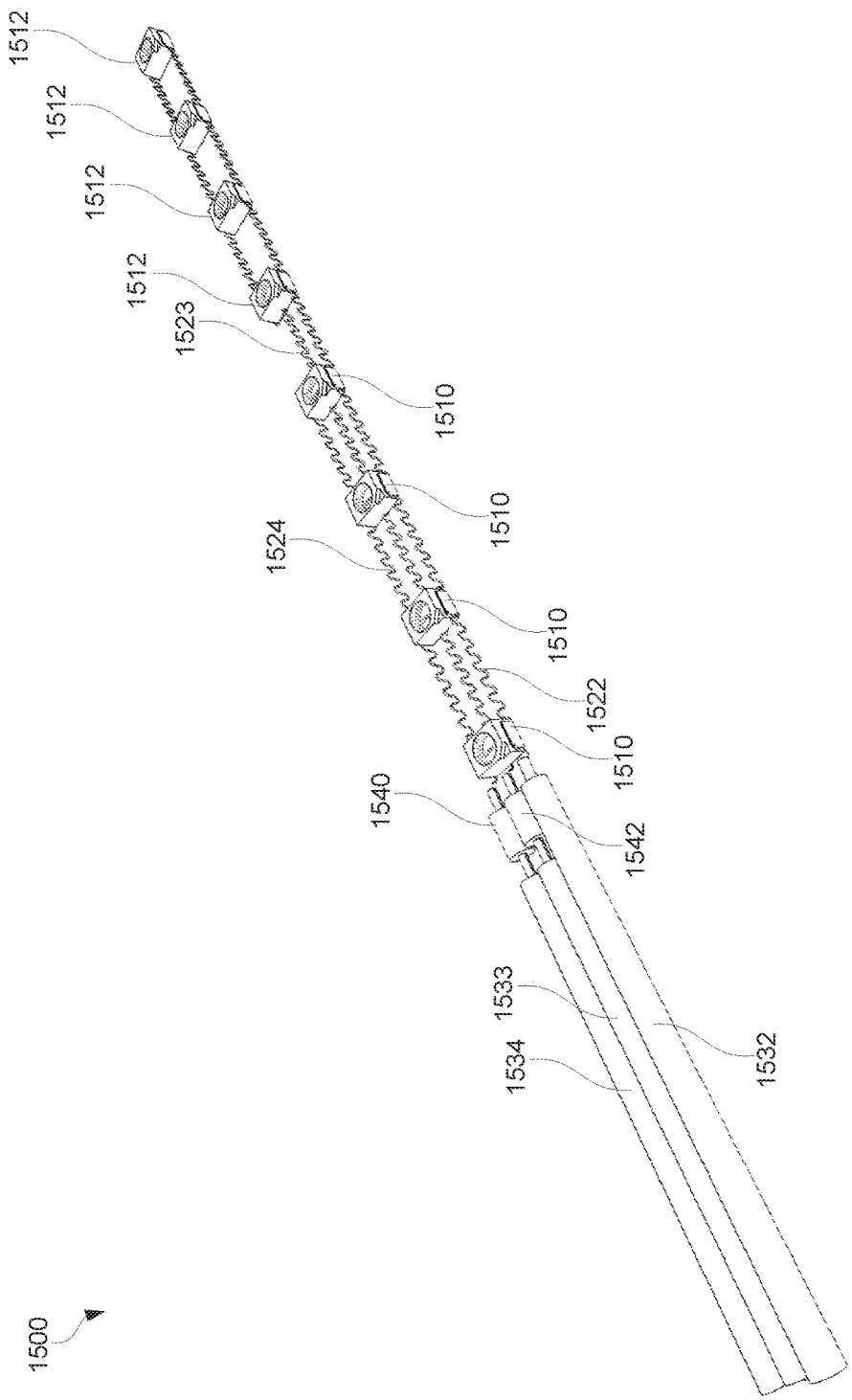

In some examples, as depicted in FIG. 15, a flexible bi-color LED light strip 1500 may include a row of PLCC2 LEDs 1510, 1512 of two different colors. The first four LEDs 1510 in the array may be one color (e.g., red) and the last four LEDs 1512 in the array may be another color (e.g., blue). The LEDs 1510, 1512 may share a common negative electrical bus 1522 that is electrically connected to the cathode of the LEDs 1510, 1512 in the array. The anodes of first four LEDs 1510 in the array may be electrically connected to the positive electrical bus 1524, which is connected to the first positive wire lead 1534 with a resistor 1540 interposed between the positive electrical bus 1524 and the positive wire lead 1534. The anodes of the second four LEDs 1512 may be electrically connected to a second positive electrical bus 1523 which is not electrically connected to the first four LEDs 1510. The positive electrical bus 1523 for the second four LEDs 1512 may be routed under the center of the first four LEDs 1510 such that the second electrical bus 1523 does not come in electrical contact with the first four LEDs 1510. The second electrical bus 1523 for the second four LEDs 1512 may be connected to a second positive wire lead 1533 with a resistor 1542 interposed between the second positive electrical bus 1523 and the second positive electrical lead 1533. The second positive wire lead 1533 may be located between the first positive wire lead 1534 and the negative wire lead 1532.

Figure 16:
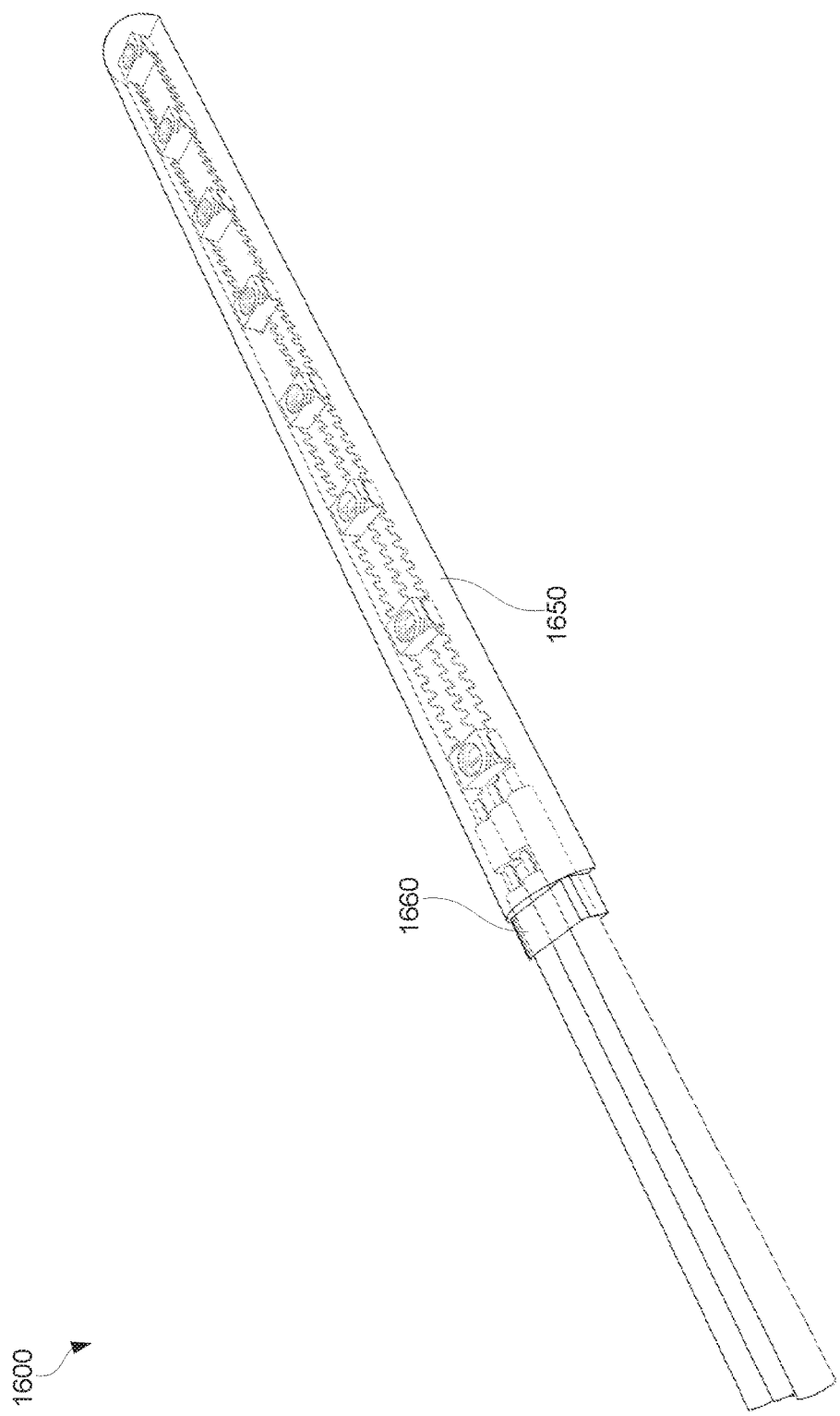

In some examples, as depicted in FIG. 16, a flexible bi-color LED light strip 1600 may be encased in a half-round profile resin-based encasement 1650 and an additional extrusion 1660 of resin extending from the end of the half round encasement 1650 covering a portion of the resistor and wire leads. In this manner, LEDs, electrical buses, resistor and a portion of the wire leads may be encased in a flexible transparent resin (e.g., a water clear polyurethane elastomer with a shore hardness of approximately 90 A) such that the entirety of the LED string, the resistor, and a portion of the wire leads are completely encased in the resin and impervious to water, moisture, and/or contaminants.

Figure 17:
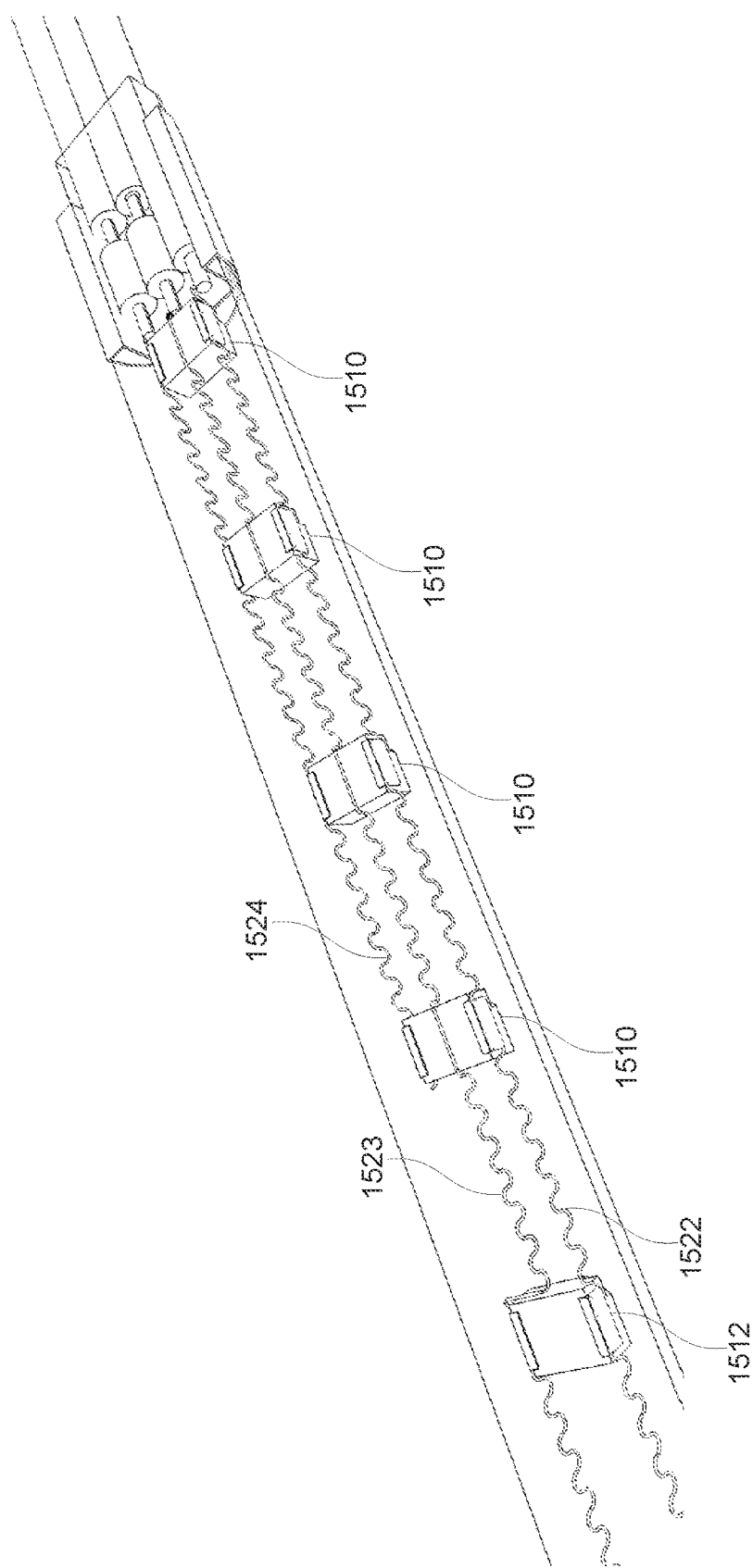

FIG. 17 depicts a view of the back (e.g., the underside) of LED light strip 1500 of FIG. 15, showing the electrical bus 1522, 1523, 1524 configuration in greater detail. The first four LEDs 1510 may be electrically connected to the negative electrical bus 1522 and may be electrically connected to the first positive electrical bus 1524. The second four LEDs 1512 (only one of which is shown in FIG. 17) may also be electrically connected to the negative electrical bus 1522, but may be connected to a second positive electrical bus 1523. The second positive electrical bus 1523 may be routed under the center of the first four LEDs 1510 so that the second positive electrical bus 1523 does not come into electrical contact with the first four LEDs 1510.

Figure 18:
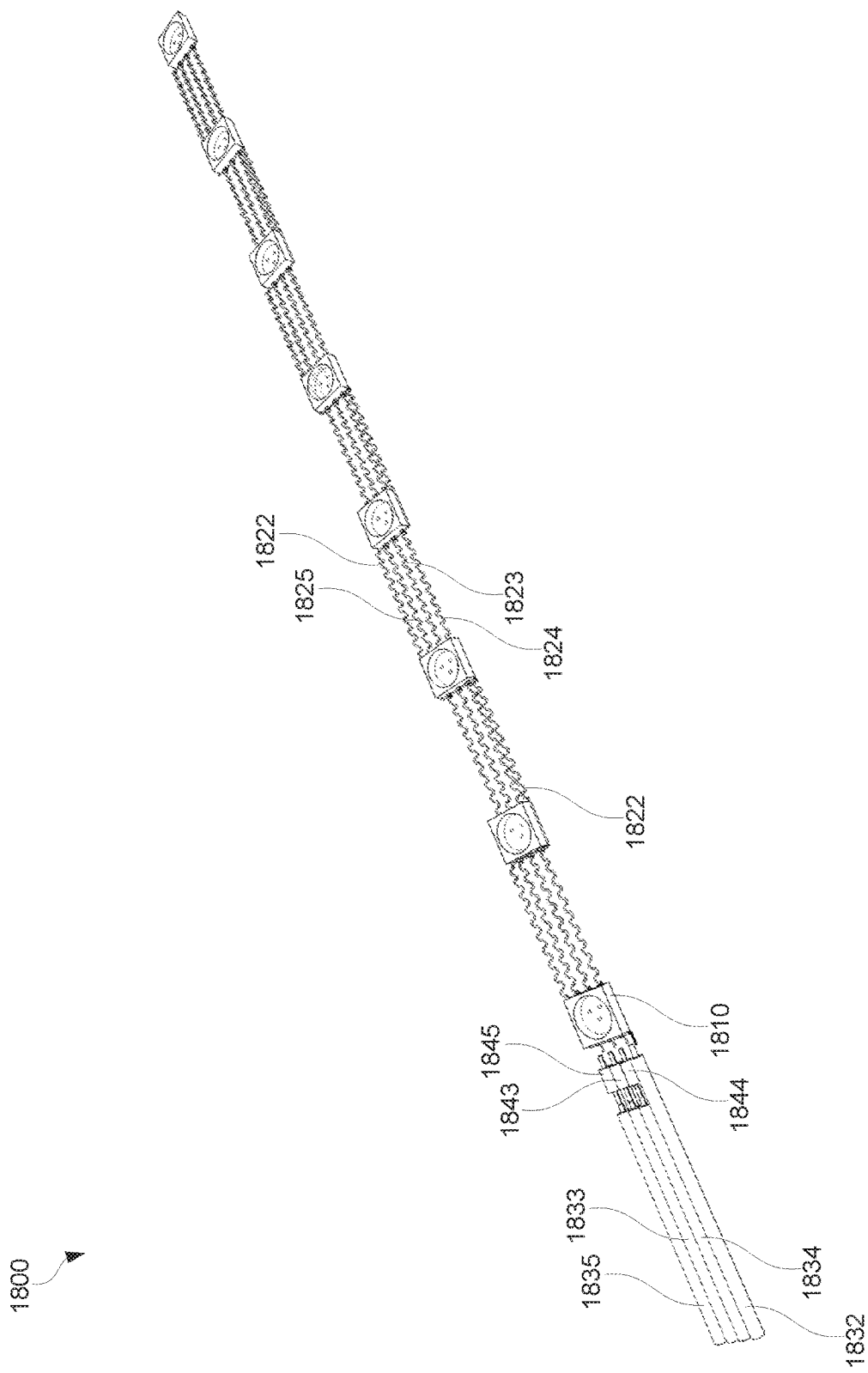

In some examples, as depicted in FIG. 18, a flexible RGB LED light strip 1800 may include an array of PLCC RGB LEDs 1810, each able to emit red, green and/or blue light. The flexible RGB LED light strip 1800 may include a negative electrical bus 1822, a first positive electrical bus 1824, a second positive electrical bus 1823, and a third positive electrical bus 1825. The negative electrical bus 1822 may be electrically connected to the cathode terminal of each color on each LED 1810. The first positive electrical bus 1824 may be electrically connected to the anode of the first color (e.g. red anode) on each LED 1810, the second positive electrical bus 1823 may be electrically connected to the anode of the second color (e.g. green anode) on each LED 1810, and the third electrical bus 1825 may be electrically connected to the anode of the third color (e.g. blue anode) on each LED 1810.

The negative electrical bus 1822 may be electrically connected to the negative wire lead 1832. The first positive electrical bus 1824 may be connected to the first positive wire lead 1834 with a resistor 1844 interposed between the first positive electrical bus 1824 and the first positive wire lead 1834. The second positive electrical bus 1823 may be connected to the second positive wire lead 1833 with a resistor 1843 interposed between the second positive electrical bus 1823 and the second positive wire lead 1833. The third positive electrical bus 1825 may be connected to the third positive wire lead 1835 with a resistor 1845 interposed between the third positive electrical bus 1825 and the third positive wire lead 1835. In some examples, the electrical buses 1822, 1823, 1824, 1825 may be made with solid wire with an insulating coating such as an enameled insulation found on magnet wire. The insulation may be removed where the electrical busses 1822, 1823, 1824, 1825 are to be electrically connected to the LED anodes or cathodes.

Figure 19:
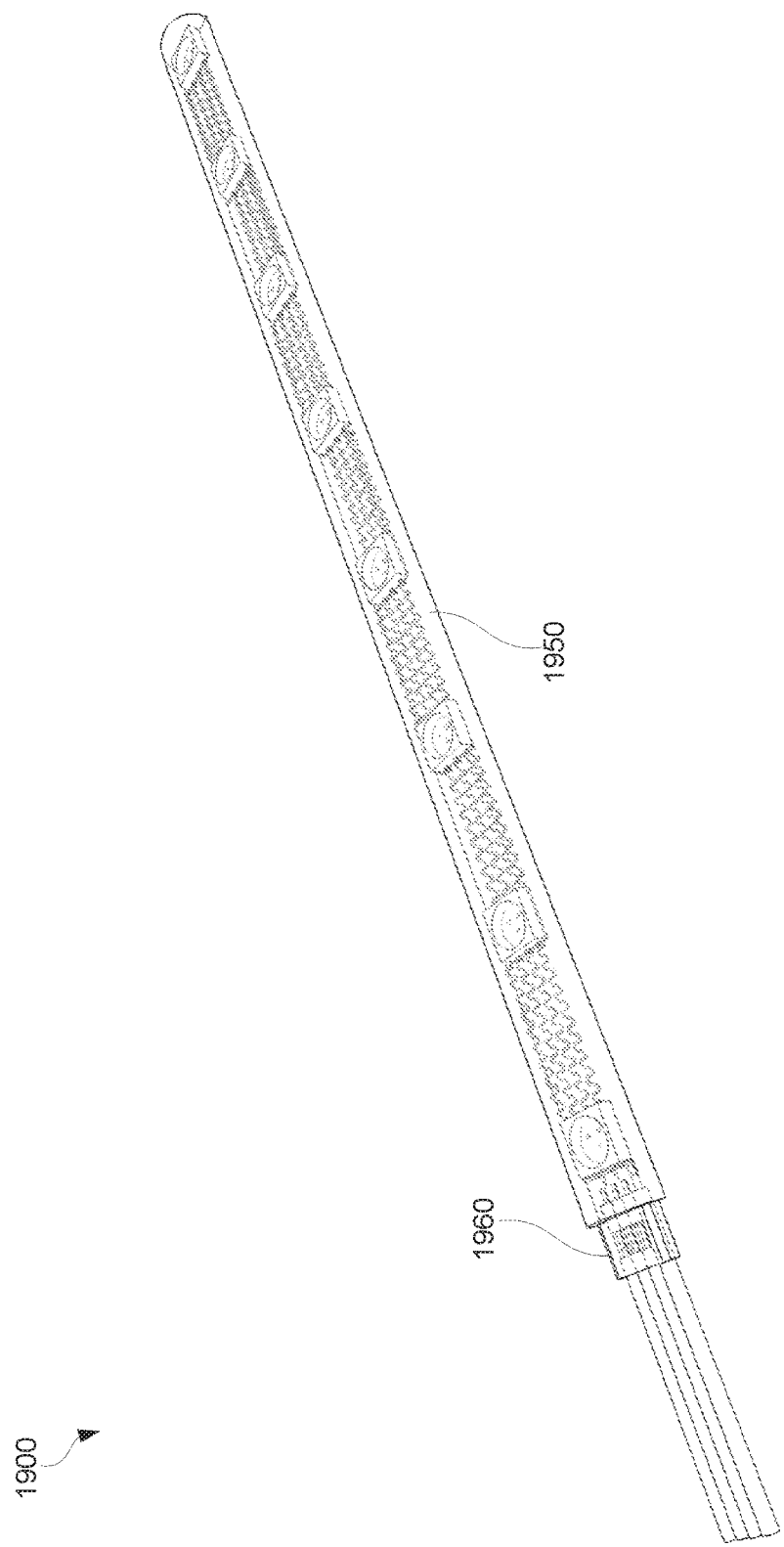

In some examples, as depicted in FIG. 19, a flexible RGB LED light strip 1900 may be encased in a half-round profile resin-based encasement 1950 and an additional extrusion 1960 of resin extending from the end of the half round encasement 1950 covering a portion of the resistor and wire leads. In this manner, LEDs, electrical buses, resistor and a portion of the wire leads may be encased in a flexible transparent resin (e.g., a water clear polyurethane elastomer with a shore hardness of approximately 90 A) such that the entirety of the LED string, the resistor, and a portion of the wire leads are completely encased in the resin and impervious to water, moisture, and/or contaminants.

Figure 20:
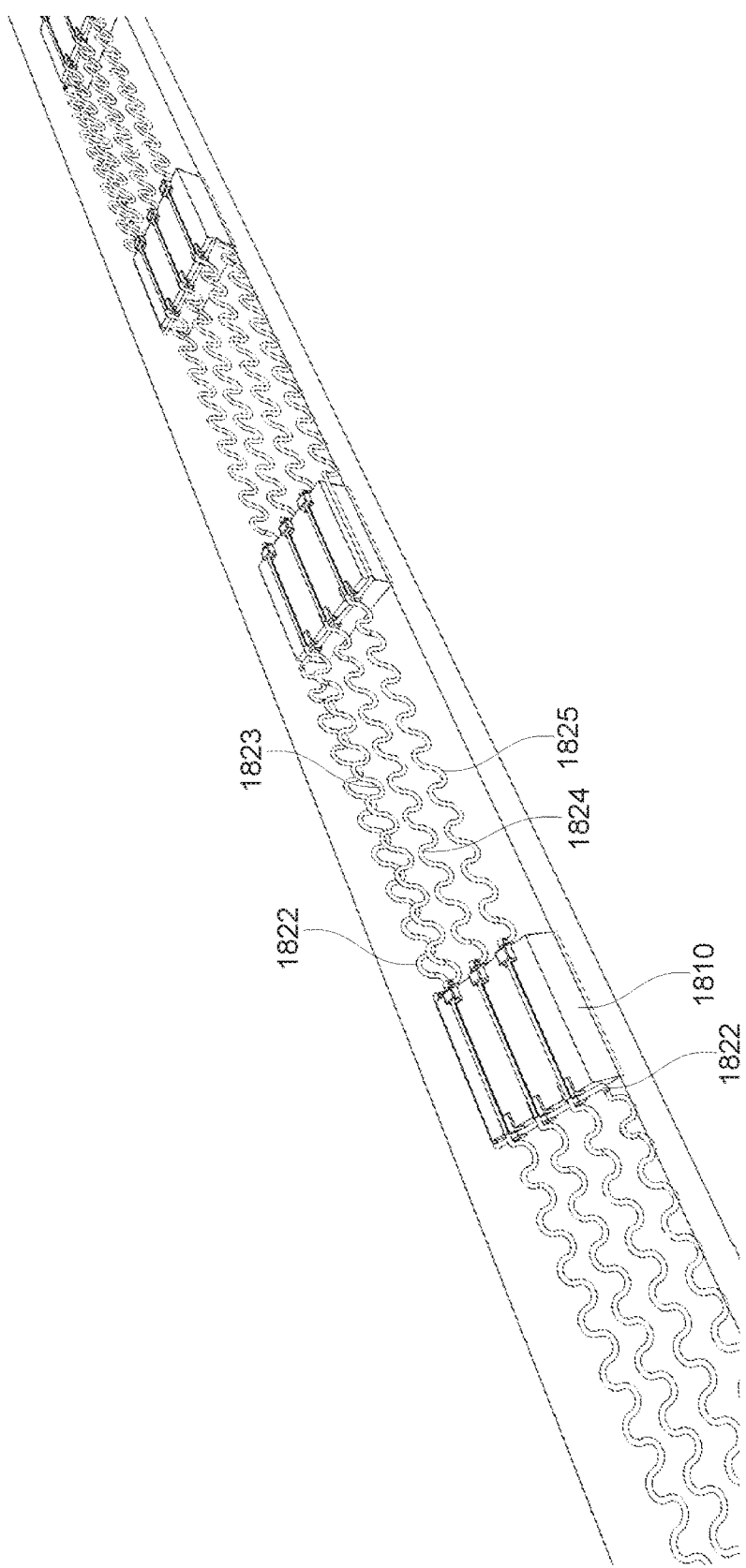

FIG. 20 depicts a view of the back (e.g., the underside) of LED light strip 1800 of FIG. 18, showing the electrical bus 1822, 1823, 1824, 1825 configuration in greater detail. The positive electrical buses 1823, 1824, 1825 may be electrically connected to the bottom of the anode of the LED 1810 for the color to which it is assigned (e.g., red, green, or blue). The negative electrical bus 1822 may be routed along the side of the LED 1820 parallel to the positive electrical buses 1823, 1824, 1825. On the cathode side of the LED 1810, the negative electrical bus 1822 runs perpendicular to and underneath the positive electrical buses 1823, 1824, 1825. The negative electrical bus 1822 may be electrically connected to the side of all the cathodes on that LED 1810, the negative electrical bus 1822 may then run parallel to the positive electrical buses 1823, 1824, 1825 on the opposite side of the strip until the negative electrical bus 1822 reaches the cathode side of the next LED 1810. The negative electrical bus 1822 then runs perpendicular to the positive electrical buses 1823, 1824, 1825 again, thus continuously forming a shape similar to the numeral "5."

Figure 21:
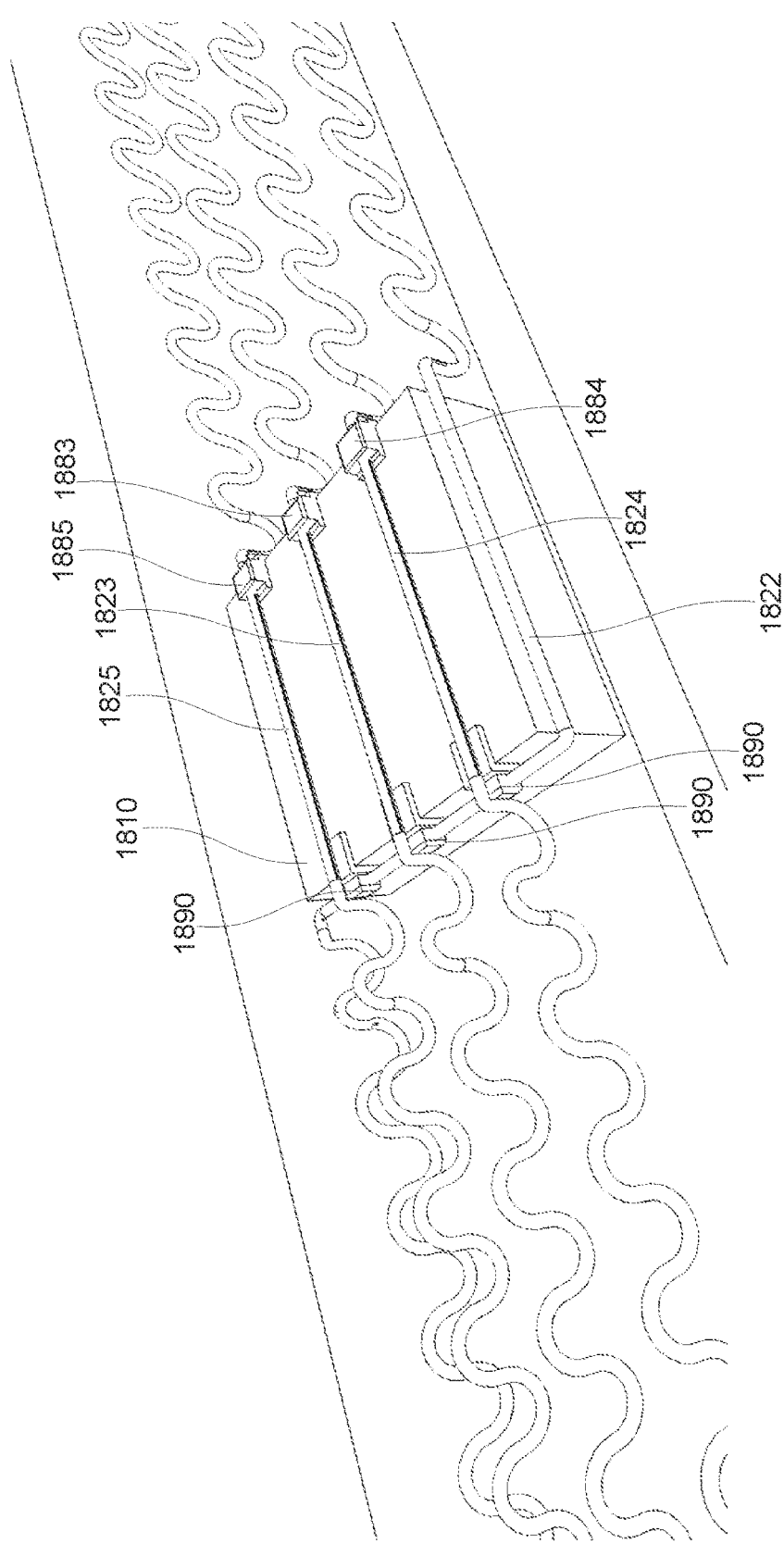

FIG. 21 depicts a view of the back (e.g., the underside) of LED light strip 1800 of FIG. 18, showing the electrical bus 1822, 1823, 1824, 1825 configuration in even greater detail than in FIG. 20. FIG. 21 depicts a view of the connection of the positive electrical buses 1823, 1824, 1825 and negative electrical bus 1822 to the LEDs 1810. The anodes 1883, 1884, 1885 of the RGB LED 1810 may be electrically connected to the respective positive electrical buses: the first positive electrical bus 1824 may be electrically connected to the first anode 1884, the second positive electrical bus 1823 may be electrically connected to the second anode 1883, and the third positive electrical bus 1825 may be connected to the third anode 1885. Each of the cathodes 1890 of the RGB LED 1810 may be electrically connected to the negative electrical bus 1822.

FIGS. 22, 23, 24A and 24B depict various components of the LED light strip 1800 of FIG. 18.

Figure 22:
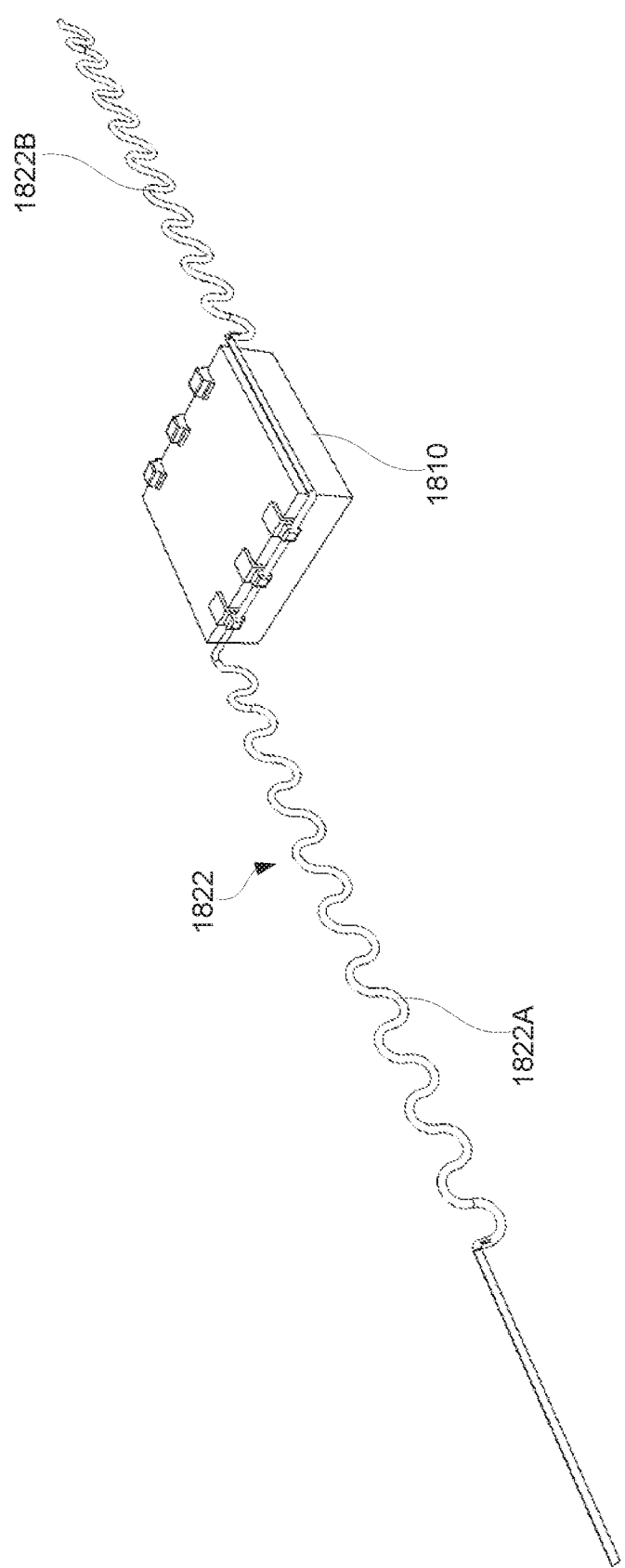
Figure 23:
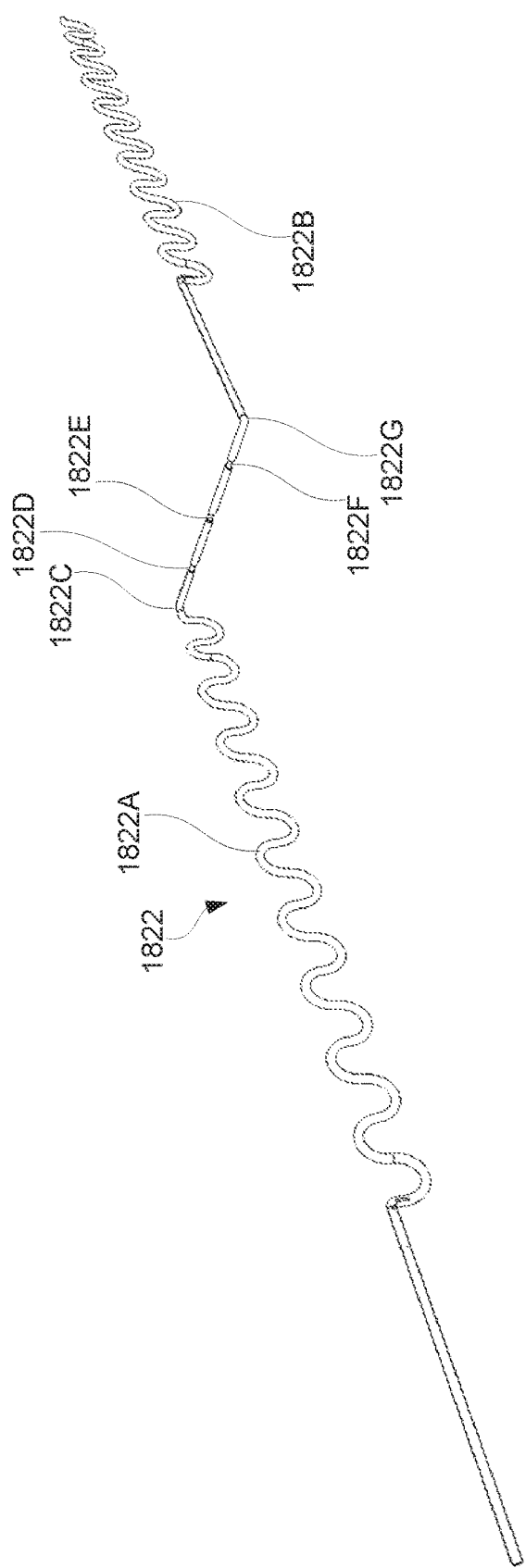

FIG. 22 depicts a section of the negative electrical bus 1822 in electrical contact with RGB LED 1810. FIG. 23 depicts a section of the negative electrical bus 1822 by itself. The negative electrical bus 1822 may include a portion 1822A formed into a sine wave shape. This portion 1822A runs parallel to the positive electrical buses (not shown) and starts and terminates between the RGB LEDs 1810 in the array. The negative terminal bus 1822A may run straight alongside the RGB LED 1810 before making a 90 degree bend 1822C and running perpendicular to the positive electrical buses (not shown). The negative electrical bus that runs perpendicular to the positive electrical buses may have three sections 1822D, 1822E, 1822F of the insulation removed such that the non-insulated portion of the electrical bus corresponds with the cathode of the RGB LED 1810 that it will be electrically connected to. As the negative electrical bus continues to the opposite edge of the RGB LED 1810 it makes another 90 degree bend 1822G and continues to run parallel to the positive electrical buses. The negative electrical bus 1822B may then continue into a sine wave shape. The negative electrical bus may continue this pattern throughout the LED light strip 1800.

Figure 24A:
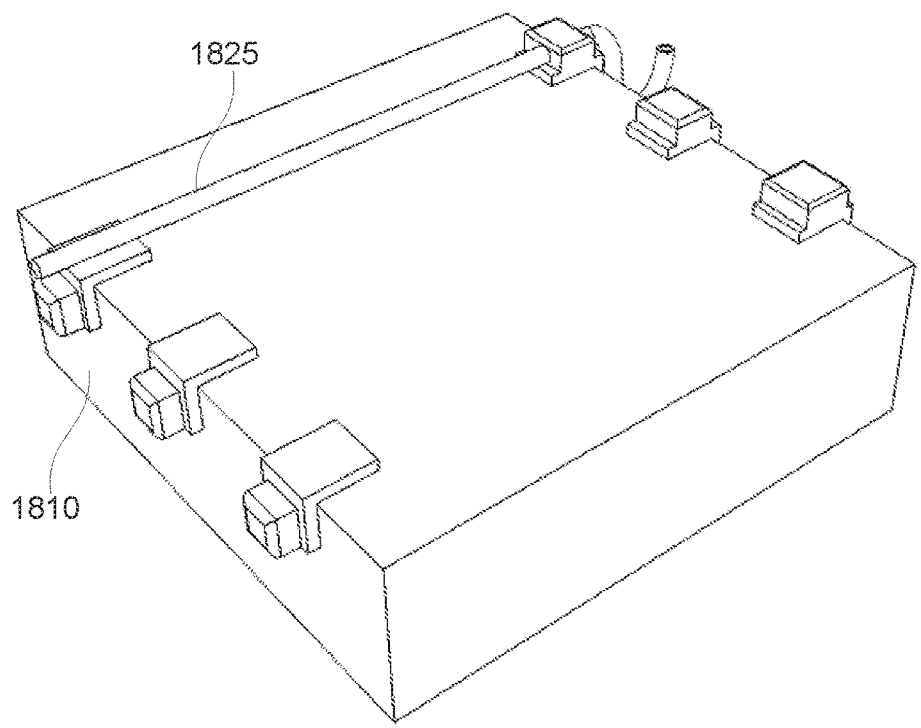
Figure 24B:
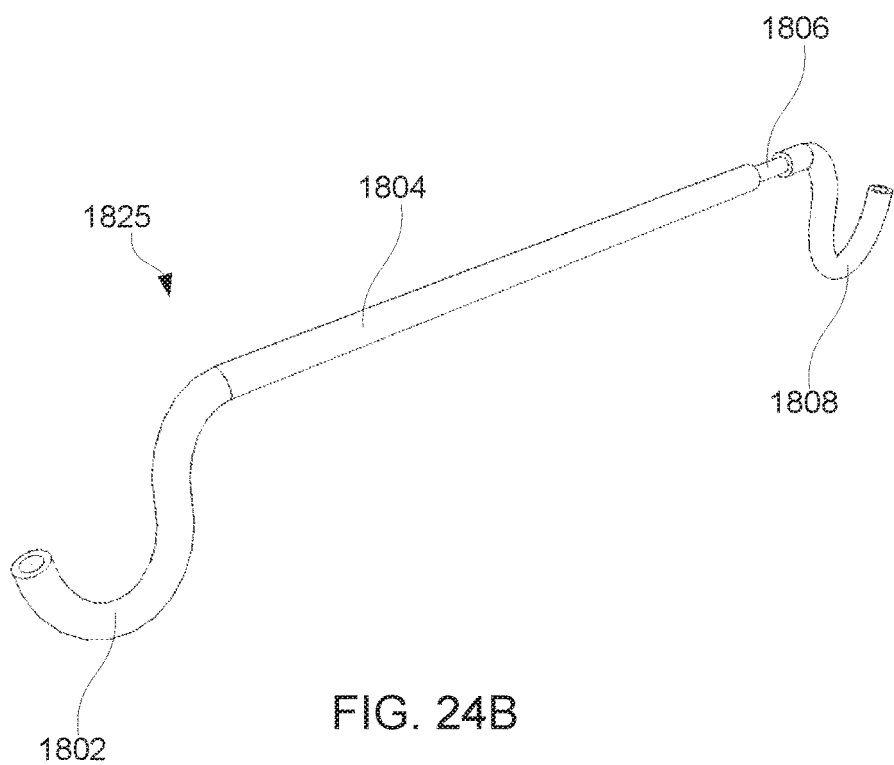

FIG. 24A depicts a section of the third positive electrical bus 1825 in electrical contact with RGB LED 1810. FIG. 24B depicts a section of the third positive electrical bus 1825 by itself. The third positive electrical bus 1825 may be formed into a sine wave shape 1802 that runs between the RGB LEDs 1810 in the array. The third positive terminal 1825 may run straight 1804 under the RGB LED 1810 and may have a portion of the insulation removed 1806 such that the non-insulated portion of the third positive electrical bus 1825 corresponds to the anode of the RGB LED 1810 that the third positive electrical bus 1825 is to be electrically connected to. The third positive electrical bus 1825 continues into a sine wave shape 1808 after being electrically connected to the anode of the RGB LED 1810. The third positive electrical bus 1825 may continue this pattern throughout the LED light strip 1800. The first positive electrical bus 1824 and second positive electrical bus 1823 may be similarly configured.

FIGS. 25, 26, 27 and 28 depict various example LED light strip configurations.

Figure 25:
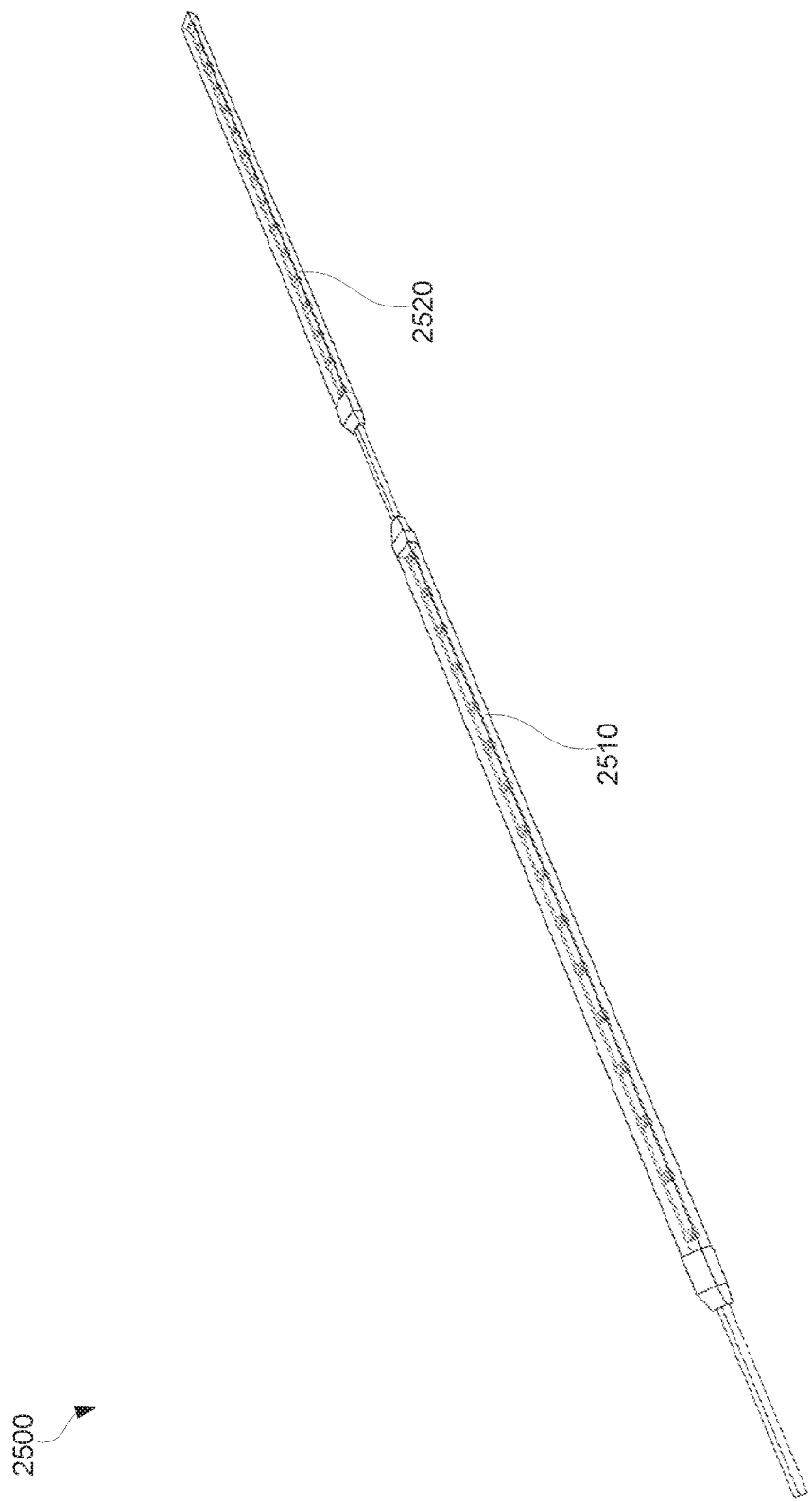

FIG. 25 depicts an example configuration 2500 including two flexible LED light strips 2510, 2520 coupled together in series. This may be accomplished by casting the strips 2510, 2520 such that the positive and negative electrical buses are connected to wire leads at the end of one strip 2510 and the wire leads are then connected to the positive and negative electrical leads of the next LED light strip 2520. In some examples, strips 2510, 2520 may be coupled together in this manner as long as the total current draw does not exceed the current capacity of the wire leads or the electrical buses in the strips 2510, 2520 and a total of only one 1 ohm resistor may be interposed between the positive electrical bus and the positive wire lead.

Figure 26:
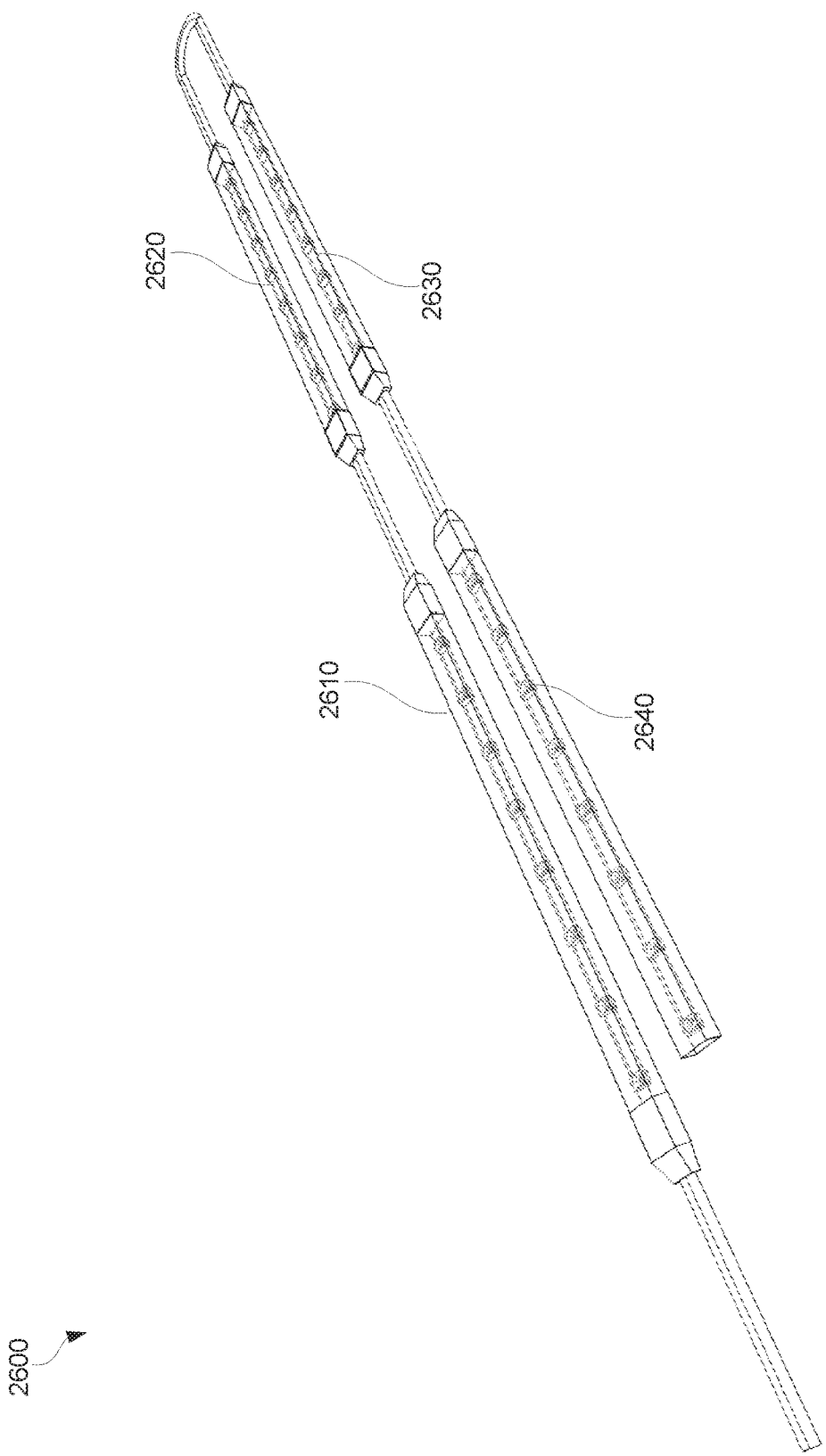

FIG. 26 depicts an example configuration 2600 including four flexible LED light strips 2610, 2620, 2630, 2640 coupled together in series. In this configuration 2600, LED light strips 2610, 2620, 2630, 2640 may be manufactured for certain applications such that there are no splices in the wire leads when coupling several strips together ensuring that the entire assembly is waterproof and impervious to contaminants.

Figure 27:
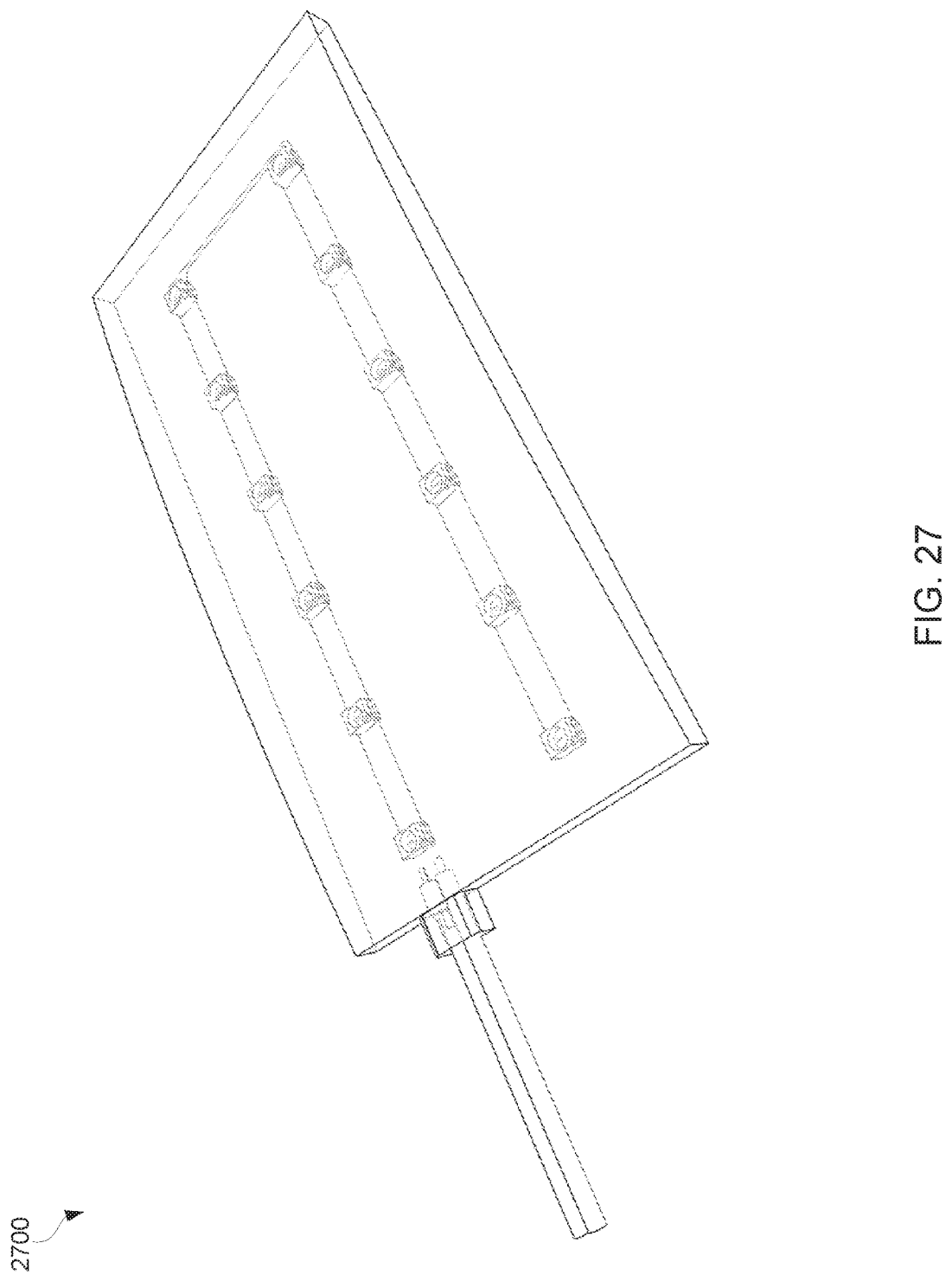

FIG. 27 depicts an example flexible LED marker light configuration 2700 that may be used on a commercial vehicle, for example. The flexible LED marker light configuration 2700 may be configured in a similar manner as the single color LED light strip described herein. The strip may then be shaped into a form fitting for the size and desired light output of the marker light prior to being cast in resin. For a yellow marker light, the LEDs chosen may be yellow, and the resin may also be tinted yellow. Because of the construction of the LED light array inside the light with the electrical buses being formed in a sine wave shape, this flexible LED marker light configuration 2700 (which is generally planer in nature) may still flex on two axes without damage to the LED light array internally. This allows this flexible LED marker light configuration 2700 to be conformably mounted on surfaces having compound curvatures.

Figure 28:
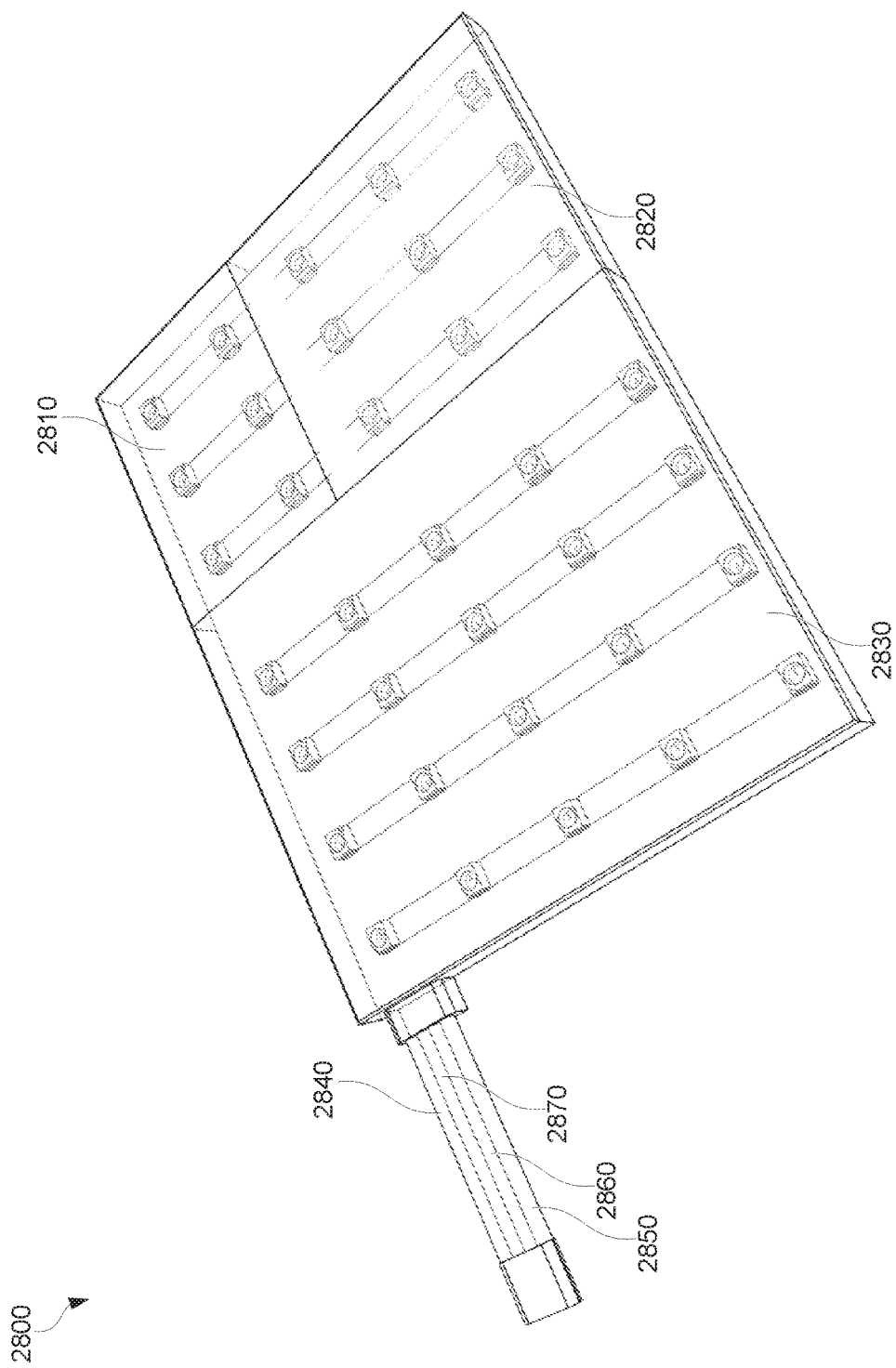

FIG. 28 depicts an example flexible LED turn, stop, tail, reverse light configuration 2800 that may be used on an automobile or motorcycle, for example. The flexible LED turn, stop, tail, reverse light configuration 2800 may be divided into three sections 2810, 2820, 2830, where each section may be independently controlled by a separate positive lead wire. The LED arrays may be constructed similarly to the single color LED light strips described herein. The light configuration 2800 may include a white led section 2810 for reverse lighting (e.g., when a vehicle's "reverse" gear is engaged), a yellow LED section 2820 for turn signaling (e.g., when a vehicle's directional turn signal is actuated), and/or a red LED section 2830 for a taillight/brake light section signaling (e.g., when a vehicle's brake pedal is engaged). Brightness of the red section 2830 may increase and/or decrease during braking. This may be controlled using pulse width modulation in the control box power supply. All three sections 2810, 2820, 2830 may share a common negative lead wire 2840 and each section 2810, 2820, 2830 may be connected to its own positive lead wire 2850, 2860, 2870 (respectively) and a 1 ohm resistor (not shown) may be connected between each positive electrical bus and its respective positive lead wire 2850, 2860, 2870. Because of the construction of the LED light array inside the light with the electrical buses being formed in a sine wave shape, this flexible LED turn, stop, tail, reverse light configuration 2800 (which is generally planer in nature) may still flex on two axes without damage to the LED light array internally. This allows this flexible LED turn, stop, tail, reverse light configuration 2800 to be conformably mounted on surfaces having compound curvatures.

Figure 29:
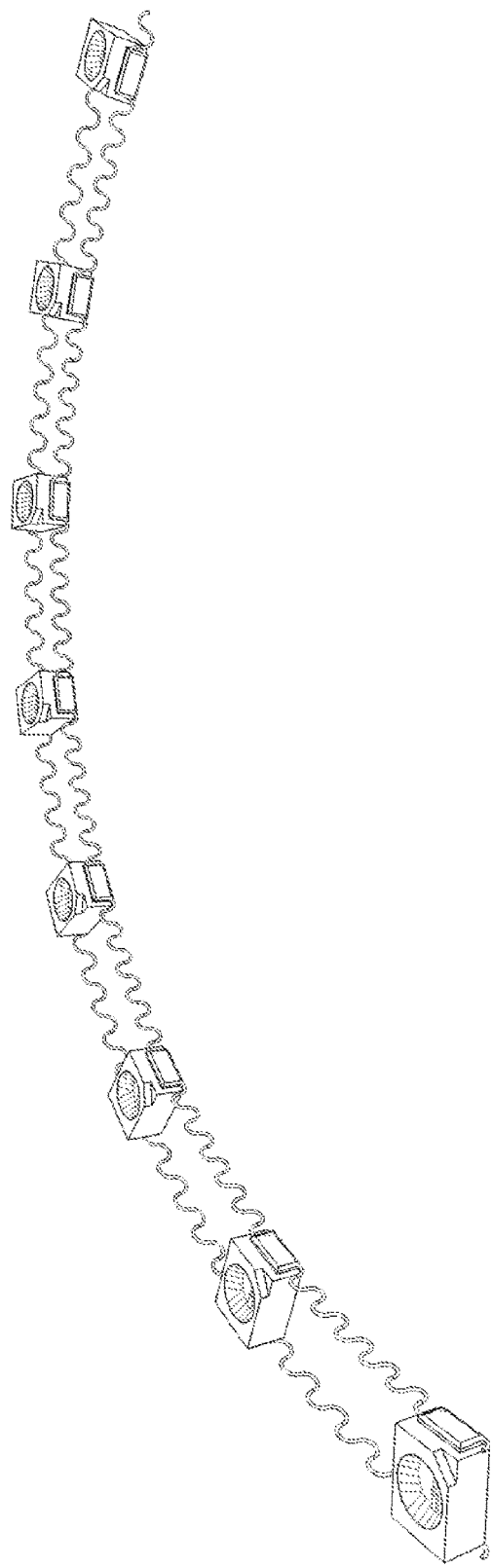
Figure 30:
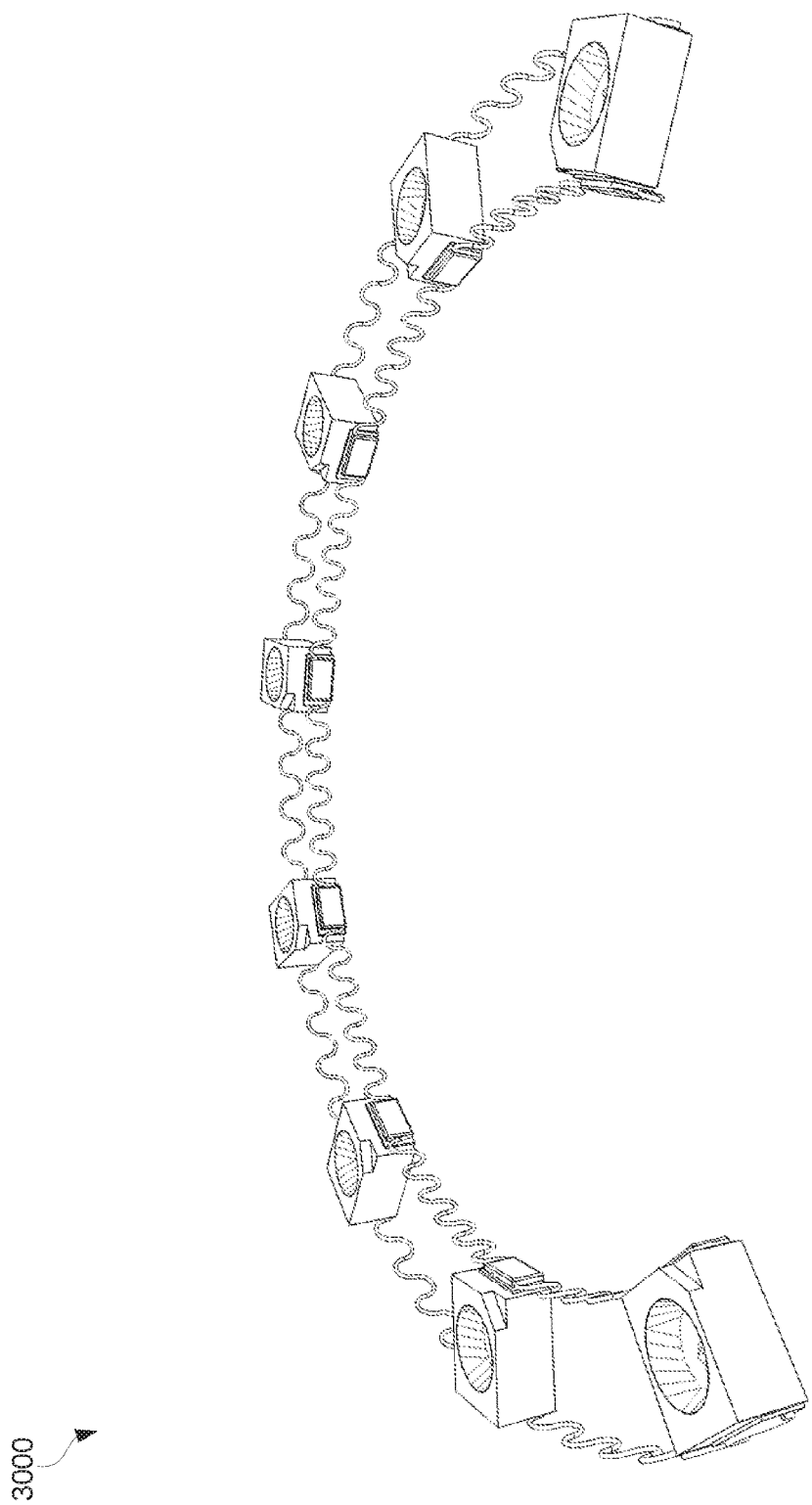
Figure 31:
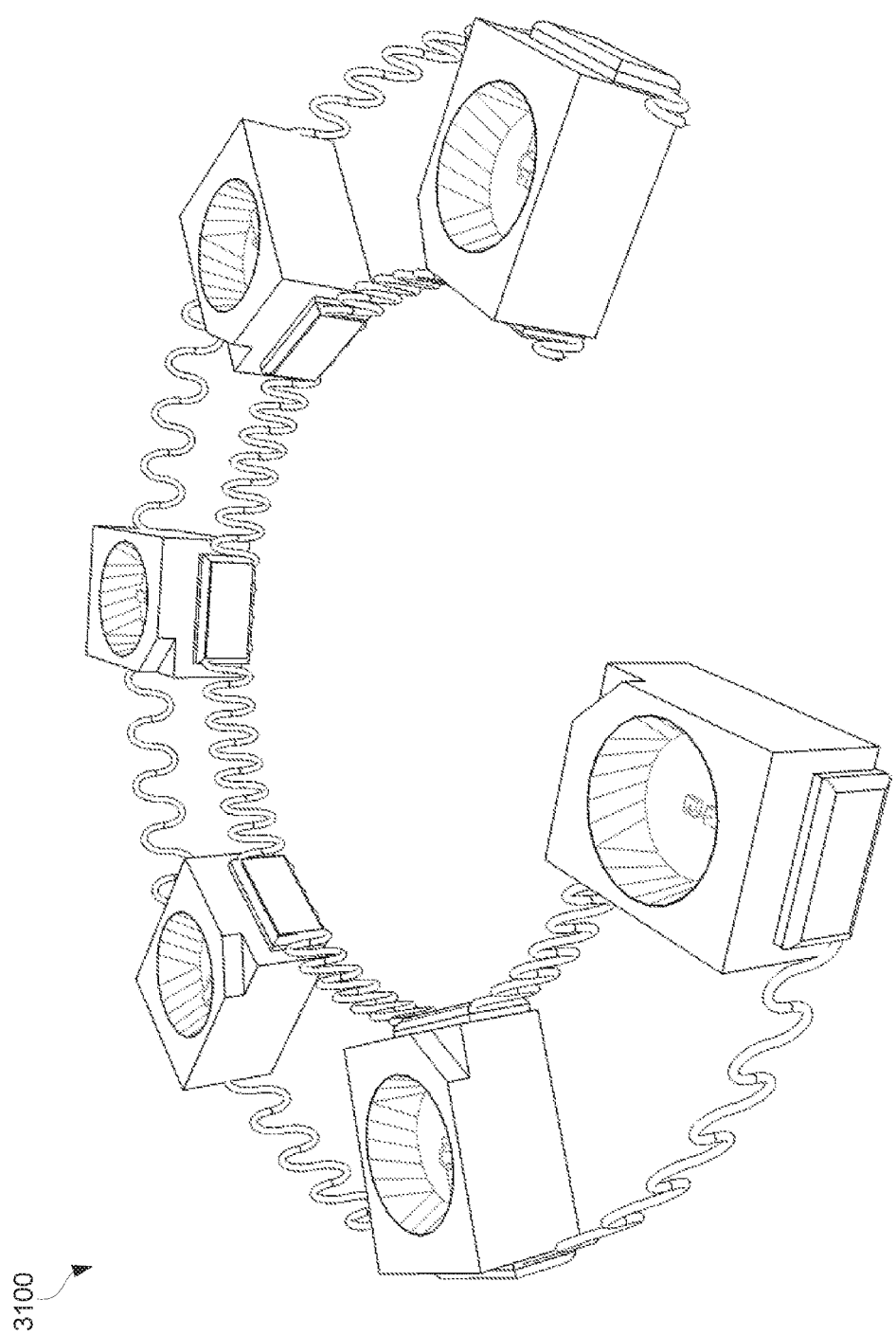

FIGS. 29, 30 and 31 depict example LED light strip configurations in various states of expansion and/or compression. FIGS. 29, 30 and 31 depict the expansion and compression of the negative and positive electrical buses as an LED light array is flexed about the Z axis. As shown is FIG. 29, as the LED light array 2900 begins to flex about the Z axis, the positive electrical bus needs to increase in length (or expand) in order to accommodate the increased distance between the anodes of the LEDs in the array. Likewise, the negative electrical bus needs to decrease in length (or compress) to accommodate the decrease in distance between the cathodes of the LEDs in the array. Because these example electrical buses are formed in the shape of a sine wave the distance between the peeks of the waves may increase or decrease as necessary to keep the electrical bus from breaking during compression and/or expansion. FIGS. 30 and 31 depict how an increasing curvature may affect the positive and negative electrical buses.

Figure 32:
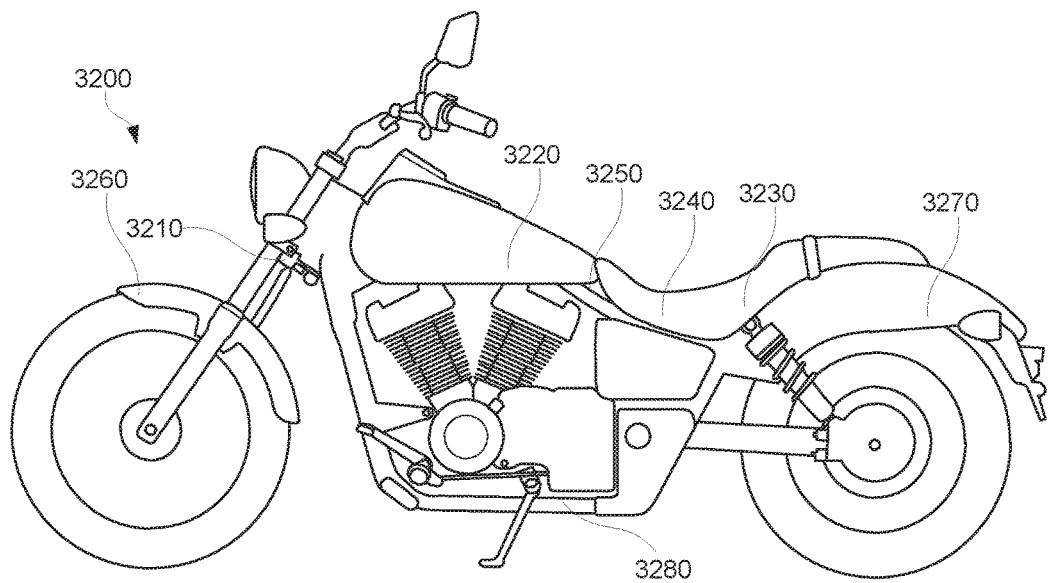
FIGS. 32-35 depict several example vehicles onto which example lighting systems may be installed, all arranged in accordance with at least some embodiments of the present disclosure.
Figure 33:
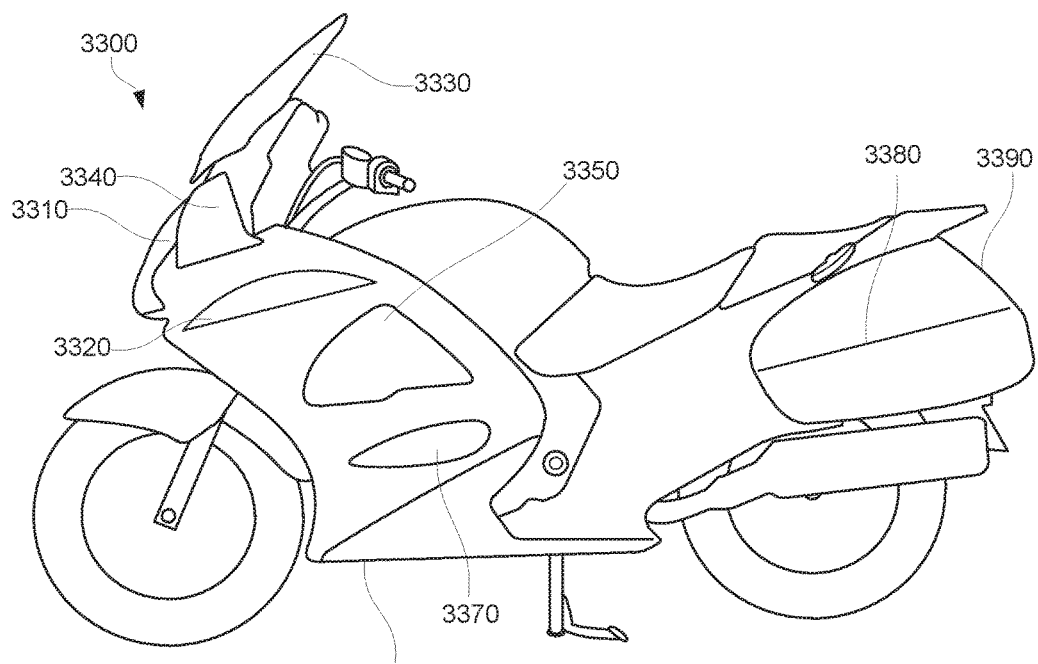

FIGS. 32 and 33 depict possible installation points for installing example LED light systems on different motorcycle types.

FIG. 32 depicts possible installation points for installing example LED light systems on an example cruiser-type motorcycle 3200. Example LED light systems may be installed at various locations on a cruiser-type motorcycle 3200. In some examples, light strips may be installed (e.g., light strips may be coupled to connectors and/or to the cruiser-type motorcycle 3200) near, under and/or around the triple clamp 3210, the fuel tank 3220, rear portion of the seat 3230, the front fender 3260, the rear fender 3270, and/or under the frame 3280, among other places. A power supply control box may be installed near and/or under the seat 3240. A wire harness may be installed throughout and/or around the cruiser-type motorcycle 3200's frame in order to electrically connect the light strips and the power supply control box to a power supply (e.g., the cruiser-type motorcycle 3200's battery or a supplemental battery).

FIG. 33 depicts possible installation points for installing example LED light systems on an example sport-type motorcycle (e.g., a police motorcycle) 3300. Example LED light systems may be installed at various locations on a sport-type motorcycle 3300. In some examples, light strips may be installed (e.g., light strips may be coupled to connectors and/or to the sport-type motorcycle 3300) near, under and/or around the headlight 3310, side fairing 3320, windscreen 3330, mirror(s) 3340, engine compartment 3350, under fairing 3360, engine guards 3370, side of saddlebags 3380, and/or rear of saddlebags 3390, among other places. A power supply control box may be installed near and/or under the seat. A wire harness may be installed throughout and/or around the sport-type motorcycle 3300's frame in order to electrically connect the light strips and the power supply control box to a power supply (e.g., the sport-type motorcycle 3300's battery or a supplemental battery).

Example lighting systems may be suited for decorative accent lighting on custom cruiser style motorcycles where the owner wishes to have his motorcycle attract more attention in low light conditions. The wire harness may be configured to place waterproof connectors at the common service points along the frame of the motorcycle. This may allow the LED lighting devices to be installed on the motorcycle and the components that the lights are installed on may be removed by disconnecting the LED light from the connector. Larger motorcycles such as the touring type that have a full fairing and rear trunk and saddlebags may require a wire harness with more connector outlets located at more positions along the motorcycle frame.

In the case of law enforcement motorcycles, the lighting system described here may be applicable since example lighting systems may be transparent. Therefore, some example lighting systems may be discreet when installed so as to be used on unmarked or marked police motorcycles. With the feature of being flexible on two axes this product may be conformably mounted to many areas on a police motorcycle to provide excellent light coverage and visibility to areas not accessible by conventional LED lighting devices used currently. For example, some LED light strips may follow the contour of the front headlight on a Honda® and BMW® police motorcycles, outlining the headlight with a blue or red flashing LED light strip. Some example LED light strips may be mounted on the outside of the rear saddle bags, alongside engine guards, and along the profile of the rearview mirrors. Police motorcycles receive regular service due to the severe duty they endure. The ability to have the LED lighting devices removably connected may be desirable to improve serviceability of the motorcycle. During servicing, body components with example LED lighting devices mounted to them may be quickly removed by disconnecting the LED lighting device via a connector from the wire harness. Some example LED lighting devices may be configured with high brightness LEDs giving excellent visibility during daylight. In such examples, the power supply control box may be able to dim the output of the LEDs for low light and night operation as to not be too bright as to be a safety hazard.

Figure 34:
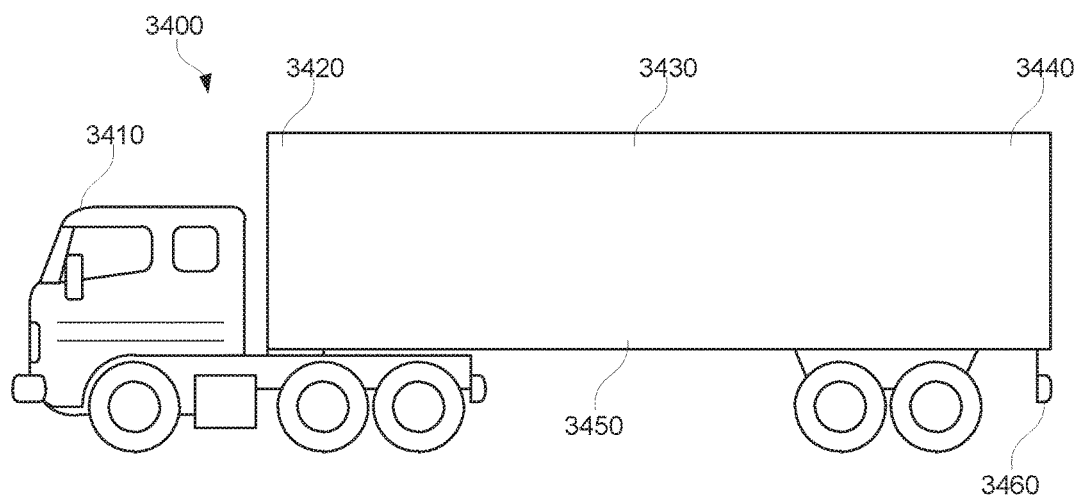
Figure 35:
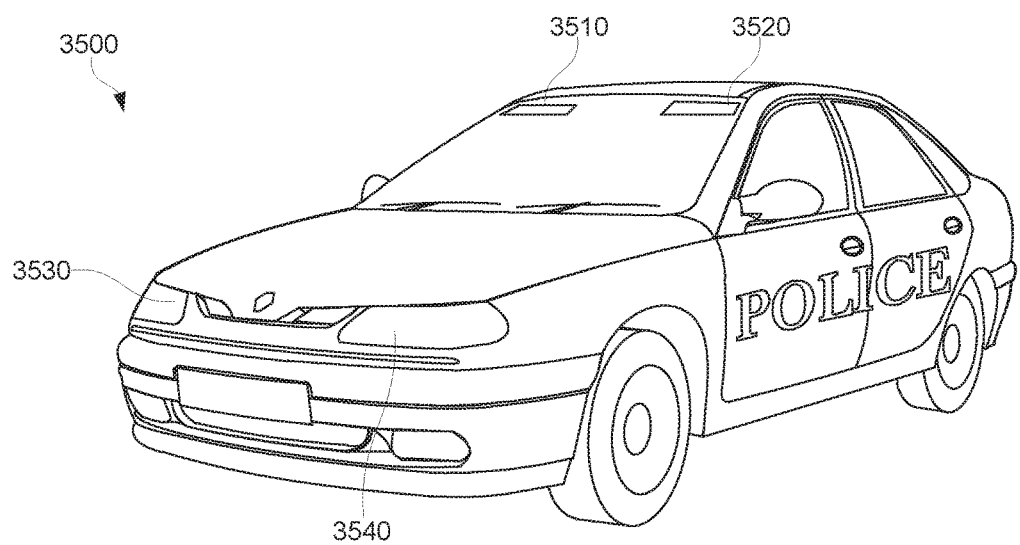

FIGS. 34 and 35 depict possible installation points for installing example LED light systems on different automobile types.

FIG. 34 depicts possible installation points for installing example LED light systems on an example semi-truck automobile 3400. Example LED light systems may be installed at various locations on a semi-truck automobile 3400. In some examples, light strips may be installed (e.g., light strips may be coupled to connectors and/or to the semi-truck automobile 3400) near, under and/or around the cabin 3410, trailer 3420, 3420, 3430, 3440, 3450, and/or tail lights 3460, among other places. A power supply control box may be installed in and/or around the cabin and/or trailer. A wire harness may be installed throughout and/or around the semi-truck automobile 3400 in order to electrically connect the light strips and the power supply control box to a power supply (e.g., the semi-truck automobile 3400's battery or a supplemental battery).

FIG. 35 depicts possible installation points for installing example LED light systems on an example police automobile 3500. Example LED light systems may be installed at various locations on a police automobile 3500 (marked and/or unmarked). In some examples, light strips may be installed (e.g., light strips may be coupled to connectors and/or to the police automobile 3500) as warning lights 3510, 3520 (e.g., visor lights) in the front and/or rear windshields, and/or headlights 3530, 3540, among other places. In some examples, warning light 3510 may emit a first color (e.g., red) and warning light 3520 may emit a second color (e.g., blue) in a constant, flashing and/or or alternating pattern, among other patterns. A power supply control box may be installed in and/or around the police automobile 3500. A wire harness may be installed throughout and/or around the police automobile 3500 in order to electrically connect the light strips and the power supply control box to a power supply (e.g., the police automobile 3500's battery or a supplemental battery). Some example LED light system may be transparent and/or translucent such that the vehicle's occupants' vision is not obstructed by light strips installed in and/or on the vehicle. For example, warning lights 3510, 3520 (e.g., visor lights) in the front and/or rear windshields may be transparent.

In the case of automotive use, specifically show cars and custom street rods, the example lighting systems may be particularly desirable in that some example lighting systems may be transparent, very discreet and highly flexible. In this manner, example lighting systems may be adapted to be used to provide decorative accent lighting in many areas where conventional systems would not be able to be used. Furthermore, some example lighting systems may be configured to provide stop, turn, tail, and reverse lights and may be cast and formed to conform to many different custom car body types and surfaces. Because of the durability of the light strip and the waterproof construction, some example lighting systems may be installed in areas that experience rough environmental conditions (e.g., headlights).

In the case of commercial vehicle use (e.g., commercial semi-tractor trailer trucks, box trucks, delivery trucks, tow trucks, repair trucks), some example lighting systems may be desirable for use in marker lights, turn signal, stop light, tail light, and reverse lights. Because of the durability of the light strip and the waterproof construction, some example lighting systems may be installed in commercial service applications.

For vehicle applications (e.g., motorcycles, automobiles), some examples disclosed herein may be installed on a vehicle as an aftermarket lighting system. Some examples may include lighting systems that are integrated into a vehicle's ignition system, brake system and directional turn signal systems, among others.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A lighting apparatus, comprising:
a positive electrical lead;
a negative electrical lead;
a plurality of light-emitting diodes; and
at least one electrical bus electrically coupling the positive electrical lead, the negative electrical lead, and the plurality of light-emitting diodes;
wherein the at least one electrical bus is expandable and compressible; and
wherein the entirety of each of the plurality of light-emitting diodes, the entirety of the at least one electrical bus, a portion of the positive electrical lead, and a portion of the negative electrical lead are completely encased in a flexible, resin-based cast.

2. The lighting apparatus of claim 1, wherein the at least one electrical bus is expandable and compressible on a plurality of axes.

3. The lighting apparatus of claim 1, further comprising:
a positive electrical bus electrically coupled to the positive electrical lead and an anode side of each of the plurality of light-emitting diodes; and
a negative electrical bus electrically coupled to the negative electrical lead and a cathode side of each of the plurality of light-emitting diodes;
wherein the light-emitting diodes are arranged in a parallel circuit.

4. The lighting apparatus of claim 1, wherein the light-emitting diodes are arranged in a series circuit.

5. The lighting apparatus of claim 1, wherein the flexible, resin-based cast includes an elastomeric component.

6. The lighting apparatus of claim 5, wherein the flexible, resin-based cast comprises a polyurethane elastomer.

7. The lighting apparatus of claim 6, wherein the flexible, resin-based cast has a Shore hardness of approximately 90 A.

8. The lighting apparatus of claim 1, wherein the plurality of light-emitting diodes comprises surface-mount light-emitting diodes with a package case.

9. The lighting apparatus of claim 1, wherein the entirety of the plurality of light-emitting diodes, the entirety of the at least one electrical bus, a portion of the positive electrical lead, and a portion of the negative electrical lead are completely encased in the flexible, resin-based cast extending continuously from a first end of the lighting apparatus to a second end of the lighting apparatus such that each of the plurality of light-emitting diodes is restricted from moving within the flexible, resin-based cast.

10. The lighting apparatus of claim 1, wherein the flexible, resin-based cast is substantially free from exposed seams of dissimilar materials.

11. The lighting apparatus of claim 1, wherein the flexible, resin-based cast is flexible on a plurality of axes.

12. A lighting system, comprising:
a power supply; and
a light-emitting diode device electrically coupled to the power supply, the light-emitting diode device comprising:
a plurality of light-emitting diodes arranged in a parallel circuit; and
at least one electrical bus electrically coupling the power supply to each of the plurality of light-emitting diodes;
wherein the at least one electrical bus is expandable and compressible; and
wherein the entirety of the light-emitting diode device and the entirety of the at least one electrical bus are completely encased in a flexible, resin-based cast.

13. The lighting system of claim 12, wherein the positive electrical bus and the negative electrical bus are expandable and compressible on a plurality of axes.

14. The lighting system of claim 12, wherein the flexible, resin-based cast comprises a polyurethane elastomer.

15. The lighting system of claim 12, wherein the entirety of the light-emitting diode device is completely encased in the flexible, resin-based cast extending continuously from a first end of the light-emitting diode device to a second end of the light-emitting diode device such that each of the plurality of light-emitting diodes is restricted from moving within the flexible, resin-based cast.

16. The lighting system of claim 12, wherein the flexible, resin-based cast is substantially free from exposed seams of dissimilar materials.

17. The lighting system of claim 12, wherein the flexible, resin-based cast is flexible on a plurality of axes.

18. A lighting system, comprising:
a power supply including a positive terminal and a negative terminal;
a first light-emitting diode device electrically coupled to the power supply, the first light-emitting diode device comprising:
a plurality of first light-emitting diodes arranged in a parallel circuit;
a first positive electrical lead electrically coupled to the positive terminal of the power supply;
a first negative electrical lead electrically coupled to the negative terminal of the power supply;
an expandable and compressible first positive electrical bus electrically coupling the first positive electrical lead and an anode end of each of the plurality of first light-emitting diodes; and
an expandable and compressible first negative electrical bus electrically coupling the first negative electrical lead and a cathode end of each of the plurality of first light-emitting diodes;

wherein the first positive electrical bus terminates at a second positive electrical lead, and the first negative electrical bus terminates at a second negative electrical lead;

wherein the entirety of each of the plurality of first light-emitting diodes, the entirety of the first positive electrical bus, the entirety of the first negative electrical bus, a portion of the first positive electrical lead, a portion of the first negative electrical lead, a portion of the second positive electrical lead, and a portion of the second negative electrical lead are completely encased in a first flexible, resin-based cast; and a second light-emitting diode device, comprising:

a plurality of second light-emitting diodes arranged in a parallel circuit;

a third positive electrical lead electrically coupled to the second positive electrical lead of the first light-emitting diode device;

a third negative electrical lead electrically coupled to the second positive electrical lead of the first light-emitting diode device;

an expandable and compressible second positive electrical bus electrically coupling the third positive electrical lead and an anode end of each of the plurality of second light-emitting diodes; and an expandable and compressible second negative electrical bus electrically coupling the third negative electrical lead and a cathode end of each of the plurality of second light-emitting diodes;

wherein the entirety of each of the plurality of second light-emitting diodes, the entirety of the second positive electrical bus, the entirety of the second negative electrical bus, a portion of the third positive electrical lead, and a portion of the third negative electrical lead are completely encased in a second flexible, resin-based cast.

19. The lighting system of claim 18, wherein the first positive electrical bus, the first negative electrical bus, the second positive electrical bus, and the second negative electrical bus are expandable and compressible on a plurality of axes.

20. The lighting system of claim 19, wherein the first flexible, resin-based cast and the second flexible, resin-based cast comprise a polyurethane elastomer.

21. The lighting apparatus of claim 18, wherein:

the entirety of each of the plurality of first light-emitting diodes, the entirety of the first positive electrical bus, the entirety of the first negative electrical bus, a portion of the first positive electrical lead, a portion of the first negative electrical lead, a portion of the second positive electrical lead, and a portion of the second negative electrical lead are completely encased in the first flexible, resin-based cast extending continuously from a first end of the first light-emitting diode device to a second end of the first light-emitting diode device such that each of the plurality of first light-emitting diodes is restricted from moving within the first flexible, resin-based cast; and the entirety of each of the plurality of second light-emitting diodes, the entirety of the second positive electrical bus, the entirety of the second negative electrical bus, a portion of the third positive electrical lead, and a portion of the third negative electrical lead are completely encased in the second flexible, resin-based cast extending continuously from a first end of the second light-emitting diode device to a second end of the second light-emitting diode device such that each of the plurality of second light-emitting diodes is restricted from moving within the second flexible, resin-based cast.

22. The lighting system of claim 18, wherein the first and second flexible, resin-based casts are substantially free from exposed seams of dissimilar materials.

23. The lighting system of claim 18, wherein the first and second flexible, resin-based casts are flexible on a plurality of axes.

* * * * *